(12) United States Patent
Taherzadeh Boroujeni et al.

(10) Patent No.: US 12,231,928 B2
(45) Date of Patent: Feb. 18, 2025

(54) RELIABILITY ENHANCEMENT IN DOWNLINK COMMUNICATION

(71) Applicant: InterDigital Patent Holdings, Inc., Wilmington, DE (US)

(72) Inventors: Mahmoud Taherzadeh Boroujeni, San Diego, CA (US); Shahrokh Nayeb Nazar, San Diego, CA (US); Oghenekome Oteri, San Diego, CA (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 657 days.

(21) Appl. No.: 17/266,839

(22) PCT Filed: Aug. 8, 2019

(86) PCT No.: PCT/US2019/045655
§ 371 (c)(1),
(2) Date: Feb. 8, 2021

(87) PCT Pub. No.: WO2020/033647
PCT Pub. Date: Feb. 13, 2020

(65) Prior Publication Data
US 2021/0352501 A1  Nov. 11, 2021

Related U.S. Application Data

(60) Provisional application No. 62/716,080, filed on Aug. 8, 2018.

(51) Int. Cl.
*H04W 24/08* (2009.01)
*H04W 72/0446* (2023.01)
(Continued)

(52) U.S. Cl.
CPC ....... *H04W 24/08* (2013.01); *H04W 72/0446* (2013.01); *H04W 72/23* (2023.01); *H04W 72/56* (2023.01)

(58) Field of Classification Search
CPC . H04W 24/08; H04W 72/0446; H04W 72/23; H04W 72/56; H04L 5/0094; H04L 5/0053; H04L 1/0038
See application file for complete search history.

(56) References Cited

U.S. PATENT DOCUMENTS 8,774,104 B2   7/2014  Zeira et al.
9,313,782 B2   4/2016  Chen et al.
(Continued)

FOREIGN PATENT DOCUMENTS

CN   102395206 A   3/2012
CN   103326841 A   9/2013
(Continued)

OTHER PUBLICATIONS

3$^{rd}$ Generation Partnership Program, "Summary of remaining issues on PDCCH monitoring with TP", 3GPP TSG RAN WG1 Meeting #92, R1-1801338, Huawei, HiSilicon, Athens, Greece, Feb. 26-Mar. 2, 2018, 4 pages.

(Continued)

*Primary Examiner* — Abdullahi Ahmed
(74) *Attorney, Agent, or Firm* — Condo Roccia Koptiw LLP

(57) ABSTRACT

A WTRU may be configured with a plurality of monitoring patterns. The WTRU may determine, based at least in part upon the particular slot in the downlink channel, monitoring occasions for each of the plurality of monitoring patterns. The WTRU determines PDCCH candidates for each of the plurality of monitoring patterns and evaluates the total number of PDCCH candidates for each of the plurality of (Continued)

monitoring patterns against blind detection limits. The WTRU selects one of the plurality of monitoring patterns for the slot based at least in part on determining the PDCCH candidates for the selected monitoring pattern satisfy the blind detection limits.

14 Claims, 14 Drawing Sheets

(51) Int. Cl.
*H04W 72/23* (2023.01)
*H04W 72/56* (2023.01)

(56) References Cited

U.S. PATENT DOCUMENTS

| | | | |
|---|---|---|---|
| 9,473,965 | B2 | 10/2016 | Lee et al. |
| 9,794,913 | B2 | 10/2017 | Lee et al. |
| 9,867,186 | B2 | 1/2018 | Xu et al. |
| 9,918,335 | B2 | 3/2018 | Kim et al. |
| 10,165,582 | B2 | 12/2018 | Papasakellariou |
| 10,652,876 | B2 | 5/2020 | Seo et al. |
| 10,743,297 | B2 | 8/2020 | Nazar et al. |
| 11,026,253 | B2 | 6/2021 | Venugopal et al. |
| 11,218,271 | B2 | 1/2022 | Xiong et al. |
| 11,799,600 | B2 | 10/2023 | Boroujeni et al. |
| 2012/0282936 | A1 | 11/2012 | Gao et al. |
| 2013/0021994 | A1 | 1/2013 | Ji et al. |
| 2013/0039284 | A1 | 2/2013 | Marinier et al. |
| 2013/0039824 | A1 | 2/2013 | Abu-Sharkh |
| 2013/0242882 | A1 | 9/2013 | Blankenship et al. |
| 2014/0286297 | A1 | 9/2014 | Zhao et al. |
| 2014/0328295 | A1* | 11/2014 | Ko .................. H04W 72/23 |
| | | | 370/329 |
| 2015/0092646 | A1 | 4/2015 | Tabet et al. |
| 2016/0113008 | A1 | 4/2016 | Damnjanovic et al. |
| 2016/0242203 | A1 | 8/2016 | You et al. |
| 2017/0013626 | A1 | 1/2017 | Nan et al. |
| 2017/0332359 | A1 | 11/2017 | Tsai et al. |
| 2017/0353963 | A1 | 12/2017 | Hong et al. |
| 2017/0359807 | A1 | 12/2017 | Hong et al. |
| 2018/0198650 | A1 | 7/2018 | Nogami et al. |
| 2018/0227102 | A1 | 8/2018 | John Wilson et al. |
| 2018/0227156 | A1 | 8/2018 | Papasakellariou |
| 2018/0227887 | A1 | 8/2018 | Hakola et al. |
| 2018/0254853 | A1 | 9/2018 | Jung et al. |
| 2018/0279135 | A1 | 9/2018 | Hwang et al. |
| 2018/0279273 | A1 | 9/2018 | Yang et al. |
| 2018/0324816 | A1 | 11/2018 | Islam et al. |
| 2018/0368116 | A1 | 12/2018 | Liao et al. |
| 2019/0020506 | A1* | 1/2019 | Cheng .................. H04L 1/007 |
| 2019/0028234 | A1 | 1/2019 | Seo et al. |
| 2019/0037540 | A1 | 1/2019 | Seo et al. |
| 2019/0103941 | A1 | 4/2019 | Seo et al. |
| 2019/0132851 | A1 | 5/2019 | Davydov et al. |
| 2019/0158205 | A1* | 5/2019 | Sheng .................. H04L 5/0048 |
| 2019/0173622 | A1 | 6/2019 | Xiong et al. |
| 2019/0253308 | A1* | 8/2019 | Huang .................. H04L 43/0823 |
| 2019/0268208 | A1 | 8/2019 | Seo et al. |
| 2019/0297602 | A1 | 9/2019 | You et al. |
| 2019/0305867 | A1* | 10/2019 | Tseng .................. H04L 5/0094 |
| 2019/0335492 | A1 | 10/2019 | Venugopal et al. |
| 2019/0349960 | A1 | 11/2019 | Li et al. |
| 2020/0008231 | A1 | 1/2020 | Vilaipornsawai et al. |
| 2020/0028651 | A1 | 1/2020 | Xu |
| 2020/0029310 | A1 | 1/2020 | Lee et al. |
| 2020/0036497 | A1 | 1/2020 | Xu |
| 2020/0119895 | A1 | 4/2020 | Choi et al. |
| 2020/0145079 | A1 | 5/2020 | Marinier et al. |
| 2020/0154295 | A1* | 5/2020 | Lin .................. H04W 24/08 |
| 2020/0252957 | A1* | 8/2020 | Cai .................. H04W 72/0446 |
| 2020/0389847 | A1 | 12/2020 | Deng et al. |
| 2021/0112533 | A1* | 4/2021 | Tang .................. H04W 24/02 |
| 2021/0227572 | A1* | 7/2021 | Miao .................. H04L 1/1819 |
| 2022/0070909 | A1 | 3/2022 | Takeda et al. |
| 2023/0217278 | A1* | 7/2023 | Xu .................. H04W 24/08 |
| | | | 370/329 |

FOREIGN PATENT DOCUMENTS

| | | |
|---|---|---|
| CN | 103650618 A | 3/2014 |
| CN | 103828282 A | 5/2014 |
| CN | 103916962 A | 7/2014 |
| CN | 104081709 A | 10/2014 |
| CN | 104823475 A | 8/2015 |
| CN | 105162565 A | 12/2015 |
| CN | 106888079 A | 6/2017 |
| CN | 106888079 B | 3/2021 |
| GB | 2568486 A | 5/2019 |
| JP | 2016518091 A | 6/2016 |
| RU | 2521486 C2 | 6/2014 |
| TW | 201342860 A | 10/2013 |
| TW | 201709706 A | 3/2017 |
| WO | 2009006016 A2 | 1/2009 |
| WO | 2009046061 A2 | 4/2009 |
| WO | 2009158050 A2 | 12/2009 |
| WO | 2011066793 A1 | 6/2011 |
| WO | 2013141530 A1 | 9/2013 |
| WO | 2014121641 A1 | 8/2014 |
| WO | 2016022849 A1 | 2/2016 |
| WO | 2017160100 A2 | 9/2017 |
| WO | 2017171327 A2 | 10/2017 |
| WO | 2017173038 A1 | 10/2017 |
| WO | 2018204282 A1 | 11/2018 |

OTHER PUBLICATIONS

3$^{rd}$ Generation Partnership Program, "Search space design and related issues", 3GPP TSG RAN WG1 Meeting AH 1801, R1-1800130, ZTE, Sanechips, Vancouver, Canada, Jan. 22-26, 2018, 9 pages.

3$^{rd}$ Generation Partnership Program, "NR PDCCH search space and number of BDs/CCEs per slot", 3GPP TSG RAN WG1 Meeting #91, R1-1721054, ZTE, Sanechips, Reno, USA, Nov. 27-Dec. 1, 2017, 5 pages.

3rd Generation Partnership Project (3GPP), TS 36.211 V2.0.0, "Technical Specification Group Radio Access Network, Evolved Universal Terrestrial Radio Access (E-UTRA), Physical Channels and Modulation (Release 8)", Sep. 2007, pp. 1-49.

3rd Generation Partnership Project (3GPP), TS 36.213 V2.0.0, "Technical Specification Group Radio Access Network, Evolved Universal Terrestrial Radio Access (E-UTRA), Physical Layer Procedures (Release 8)", Sep. 2007, pp. 1-13.

IEEE, , "IEEE Standard for Information technology—Telecommunications and Information Exchange between Systems—Local and Metropolitan Area Networks—Specific Requirements", Part 11: Wireless LAN Medium Access Control (MAC) and Physical Layer (PHY) Specifications, Amendment 4: Enhancements for Very High Throughput for Operation in Bands below 6GHz, IEEE Std 802.11ac-2013, Dec. 11, 2013, 425 pages.

IEEE, , "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications-A", IEEE Std 802.11 n-2009, Sep. 2009, pp. 1-536.

IEEE, , "IEEE Standard for Information technology—Telecommunications and information exchange between systems Local and metropolitan area networks—Specific requirements", Part 11: Wireless LAN Medium Access Control (MAC) and Physical Layer (PHY) Specifications, IEEE Std. 802.11-2016, Dec. 7, 2016, pp. 1-3534.

IEEE Computer Society, , "IEEE Standard for Information Technology—Telecommunications and Information Exchange between Systems Local and Metropolitan Area Networks—Specific Requirements", Part 11: Wireless LAN Medium Access Control (MAC) and Physical Layer (PHY) Specifications, Amendment 5: Television White Spaces (TVWS) Operation, IEEE 802.11af-2013, Dec. 11, 2013, 198 pages.

(56) References Cited

OTHER PUBLICATIONS

IEEE Computer Society, , "IEEE Standard for Information technology—Telecommunications and Information Exchange between Systems Local and Metropolitan Area Networks Specific Requirements", Part 11: Wireless LAN Medium Access Control (MAC) and Physical Layer (PHY) Specifications; Amendment 2: Sub 1 GHz License Exempt Operation, IEEE P802.11ah-2016, Dec. 7, 2016, 594 pages.
R1-1700257, , "NR DL Control Channel Structure", ZTE, ZTE Microelectronics, 3GPP TSG RAN WG1 NR Ad-Hoc Meeting, Spokane, USA, Jan. 16-20, 2017, pp. 1-6.
R1-1700346, , "On Beam State Reporting", Intel Corporation, 3GPP TSG RAN WG1 NR Ad-Hoc Meeting, Spokane, USA, Jan. 16-20, 2017, pp. 1-6.
R1-1700661, , "Discussion on Reference Signal in Mini-Slot", Fujitsu, TSG-RAN WG1 #NR AH Spokane, USA, Jan. 16-20, 2017, pp. 1-4.
R1-1704202, , "Search Space Design Considerations", 3GPP TSG RAN WG1 Meeting #88bis; Huawei, HiSilicon; Spokane, USA, Apr. 3-7, 2017, 4 pages.
R1-1704618, , "Search Space Design Consideration for NR PDCCH with BF", Guangdong OPPO Mobile Telecom, 3GPP TSG RAN WG1 Meeting #88bis, Spokane, Washington, Apr. 3-7, 2017, 8 pages.
R1-1704632, , "On Multiplexing eMBB and URLLC in DL", Guangdong OPPO Mobile Telecom, 3GPP TSG RAN WG1 meeting #88bis, Spokane, Washington, USA, Apr. 3-7, 2017, 4 pages.
R1-1704950, , "Search Space Design for NR-PDCCH", ETRI, 3GPP TSG RAN WG1 #88bis, Spokane, USA, Apr. 3-7, 2017, pp. 1-4.
R1-1705583, , "Control Channel Multi-Beam Operation", 3GPP TSG-RAN WG1 #88bis; Qualcomm Incorporated; Spokane, USA, Apr. 3-7, 2017, 4 pages.
R1-1705718, , "Views on beam management framework", 3GPP TSG RAN WG1 Meeting #88bis; NTT DOCOMO, Inc.; Spokane, USA, Apr. 3-7, 2017, 8 pages.
R1-1708333, , "On Multi-TRP/Panel Transmission for DL", InterDigital Inc., 3GPP TSG RAN WG1 Meeting #89, Hangzhou, China, May 15-19, 2017, 4 pages.
R1-1708345, , "Design Considerations for Beam-Based PDCCH", InterDigital Inc., 3GPP TSG RAN WG1 Meeting #89, Hangzhou, China, May 15-19, 2017, pp. 1-4.
R1-1708979, , "Impact on eMBB DMRS puncturing by URLLC burst", Wilus Inc., 3GPP TSG RAN WG1 Meeting #89, Hangzhou, p. R. China, May 15-19, 2017, pp. 1-6.
R1-1708980, , "Pre-Emption Indication on DL Multiplexing between eMBB and URLLC", Wilus Inc., 3GPP TSG RAN WG1 Meeting #89, Hangzhou, P.R. China, May 15-19, 2017, 3 pages.
R1-1709986, , "PDCCH Reliability for URLCC", Huawei, HiSilicon, 3GPP TSG RAN WG1 NR Ad Hoc Meeting, Qingdao, China, Jun. 27-30, 2017, 7 pages.
R1-1710923, , "DCI Design for Multi-TRP/Panel Transmission for DL", InterDigital Inc., 3GPP TSG RAN WG1 Meeting NRAH2, Qingdao, China, Jun. 27-30, 2017, 3 pages.
R1-1710944, , "On the Impact of Multi-Beam Operation on PDCCH Structure", InterDigital Inc., 3GPP TSG RAN WG1 NR Ad-Hoc#2, Qingdao, China, Jun. 27-30, 2017, pp. 1-5.
R1-1712394, , "Discussion on multi-beam operation for NR-PDCCH", 3GPP TSG RAN WG1 Meeting #90; Prague, Czechia; Agenda item: 6.1.3.1.2.3; Source: CATT, Aug. 21-25, 2017, 5 pages.
R1-1715517, , "Consideration on Monitoring Preemption Indication in Bandwidth Parts", Spreadtrum Communications, 3GPP TSG RAN WG1 Meeting AdHoc #3, Nagoya, Japan, Sep. 18-21, 2017, 2 pages.
R1-1716325, , "Multiplexing of Different Data Channel Durations", Intel Corporation, 3GPP TSG RAN WG1 Meeting NR#3, Nagoya, Japan, Sep. 18-21, 2017, 8 pages.
R1-1717838, , "Remaining Details of Pre-Emption Indication", CATT, 3GPP TSG RAN WG1 Meeting #90bis, Prague, Czechia, Oct. 9-13, 2017, 7 pages.

R1-1717955, , "Discussion on DL Control with Ultra-Reliability Requirement", LG Electronics, 3GPP TSG RAN WG1 Meeting 90bis Prague, CZ, Oct. 9-13, 2017, pp. 1-4.
R1-1718323, , "Discussions on Search Space and CORESET Designs", MediaTek Inc., 3GPP TSG RAN WG1 Meeting #90bis, Prague, CZ, Oct. 9-13, 2017, 11 pages.
R1-1719402, , "Remaining aspects on pre-emption indication for DL multiplexing of URLLC and eMBB", Huawei, HiSilicon, 3GPP TSG RAN WG1 Meeting #91, Reno, USA, Nov. 27-Dec. 1, 2017, 10 pages.
R1-1719587, , "Remaining Issues on Pre-Emption Indication", MediaTek Inc., 3GPP TSG RAN1 WG1 Meeting #91, Reno, Nevada, USA, Nov. 27-Dec. 1, 2017, 6 pages.
R1-1800600, , "Considerations for Ultra-Reliable DCI Transmission", InterDigital, Inc., 3GPP TSG RAN WG1 Meeting AH 1801, Vancouver, Canada, Jan. 22-26, 2018, 3 pages.
R1-1802615, , "Remaining Details on Paging", InterDigital Inc., 3GPP TSG RAN WG1 Meeting #92, Athens, Greece, Feb. 26-Mar. 2, 2018, 5 pages.
R1-1804841, , "Remaining Details for Paging Channel", InterDigital Inc., 3GPP TSG RAN WG1 Meeting #92bis, Sanya, China, Apr. 16-20, 2018, 7 pages.
R1-1804888, , "On Paging for NR Unlicensed Spectrum", InterDigital Inc., 3GPP TSG RAN WG1 Meeting #92bis, Sanya, China, Apr. 16-20, 2018, 3 pages.
R1-1807010, , "On Remaining Details of NR Paging Channel", InterDigital Inc., 3GPP TSG RAN WG1 Meeting #93, Busan, South Korea, May 21-25, 2018, 3 pages.
R1-1807037, , "On Initial Access for NR Unlicensed Spectrum", InterDigital Inc., 3GPP TSG RAN WG1 Meeting #93, Busan, South Korea, May 21-25, 2018, 6 pages.
TS 36.211 V10.0.0, , "3rd Generation Partnership Project (3GPP)", Technical Specification Group Radio Access Network, Evolved Universal Terrestrial Radio Access (E-UTRA), Physical Channels and Modulation (Release 10), Dec. 2010, pp. 1-103.
TS 36.211 V14.5.0, , "3rd Generation Partnership Project (3GPP)", Technical Specification Group Radio Access Network, Evolved Universal Terrestrial Radio Access (E-UTRA), Physical Channels and Modulation, (Release 14), Dec. 2017, pp. 1-197.
TS 36.211 V14.8.0, , "3rd Generation Partnership Project (3GPP)", Technical Specification Group Radio Access Network, Evolved Universal Terrestrial Radio Access (E-UTRA), Physical Channels and Modulation (Release 14), Sep. 2018, 199 pages.
TS 36.211 V15.3.0, , "3rd Generation Partnership Project (3GPP)", Technical Specification Group Radio Access Network, Evolved Universal Terrestrial Radio Access (E-UTRA), Physical Channels and Modulation, (Release 15), Sep. 2018, pp. 1-237.
TS 36.213 V14.2.0, , "3rd Generation Partnership Project (3GPP)", Technical Specification Group Radio Access Network, Evolved Universal Terrestrial Radio Access (E-UTRA), Physical Layer Procedures (Release 14), Mar. 2017, pp. 1-455.
TS 36.213 V14.4.0, , "3rd Generation Partnership Project (3GPP)", Technical Specification Group Radio Access Network, Evolved Universal Terrestrial Radio Access (E-UTRA), Physical Layer Procedures (Release 14), Sep. 2017, pp. 1-462.
TS 36.213 V14.8.0, , "3rd Generation Partnership Project (3GPP)", Technical Specification Group Radio Access Network, Evolved Universal Terrestrial Radio Access (E-UTRA), Physical layer procedures (Release 14), Sep. 2018, 468 pages.
TS 36.213 V15.3.0, , "3rd Generation Partnership Project (3GPP)", Technical Specification Group Radio Access Network, Evolved Universal Terrestrial Radio Access (E-UTRA), Physical Layer Procedures, (Release 15), Sep. 2018, pp. 1-546.
TS 38.213 V15.3.0, , "3rd Generation Partnership Project (3GPP)", Technical Specification Group Radio Access Network, NR, Physical Layer Procedures for Control (Release 15), Sep. 2018, pp. 1-101.
TS 38.331 V15.0.0, , "3rd Generation Partnership Project (3GPP)", Technical Specification Group Radio Access Network NR Radio Resource Control (RRC) Protocol Specification (Release 15), Dec. 2017, pp. 1-188.

(56) References Cited

OTHER PUBLICATIONS

TS 38.331 V15.3.0, "3rd Generation Partnership Project (3GPP)", Technical Specification Group Radio Access Network, NR, Radio Resource Control (RRC) protocol specification, (Release 15), Sep. 2018, pp. 1-445.

\* cited by examiner

RELIABILITY ENHANCEMENT IN DOWNLINK COMMUNICATION

CROSS-REFERENCE TO RELATED APPLICATIONS

This application is the National Stage Entry under 35 U.S.C. § 371 of Patent Cooperation Treaty Application No. PCT/US2019/045655, filed Aug. 8, 2019, which claims the benefit of U.S. Provisional Application No. 62/716,080, filed Aug. 8, 2018, and titled Reliability Enhancement in Downlink Communication, the contents of all of which are hereby incorporated herein by reference in their entirety.

BACKGROUND

In wireless radio systems, such as 5G and 3GPP systems, a physical layer is employed to perform various operations including mapping signals to an appropriate physical time-frequency resource. The physical layer defines physical channel types which are designated for use in performing particular operations. A Physical Downlink Shared Channel (PDSCH) is defined to transport user data from a network device to a mobile device such as, for example, a wireless transmit and receive unit (WTRU). A Physical Downlink Control Channel (PDCCH) is defined to transport downlink control information (DCI) to the WTRU. The DCI provides the WTRU with information that the WTRU uses to receive data on the PDSCH. The WTRU searches for and detects PDCCH communications in a process which may be referred to, for example, as blind decoding.

SUMMARY

Systems and implementations are described herein that may be used to adaptively detect a PDCCH. A WTRU may be configured to adaptively select, for a slot in a downlink channel, one of a plurality monitoring patterns that may be used to detect a PDCCH. The WTRU may be configured with a plurality of monitoring patterns. The WTRU may determine, based at least in part upon the slot in the downlink channel, monitoring occasions for each of the plurality of monitoring patterns. The WTRU may determine PDCCH candidates for each of the plurality of monitoring patterns. The WTRU may further determine for each of the plurality of the monitoring patterns a total number of non-overlapped covered control channel elements (CCEs) that are covered by PDCCH candidates. The WTRU may evaluate the total number of PDCCH candidates for each of the plurality of monitoring patterns against blind detection limits (e.g., limits on the number of blind decodes and/or on the number of covered CCEs inside the slot) and/or evaluate the total number of non-overlapped CCEs that are covered by PDCCH candidates against detection limits. The WTRU may select one of the plurality of monitoring patterns for the slot by at least determining that the PDCCH candidates for the selected monitoring pattern satisfy the blind detection limits and/or determining that the total number of non-overlapped CCEs covered by PDCCH candidates for the selected monitoring pattern satisfy a detection limit. For example, the WTRU may compare the determined total number of PDCCH candidates for each of the monitoring patterns against blind detection limits and may select the one of the plurality of monitoring patterns determined to have a total of PDCCH candidates that does not exceed the blind detection limits (e.g., the monitoring pattern that has a maximum number of PDCCH candidates, but is still below the blind detection limits). The WTRU may additionally compare the determined total number of non-overlapped CCEs covered by CCEs for each monitoring pattern against detection limits and may select one of the plurality of monitoring patterns determined to have a total number of non-overlapped CCEs covered by CCEs that does not exceed the detection limit. The WTRU may perform PDCCH blind detection using the selected one of the plurality of monitoring patterns.

A WTRU may be configured to limit or restrict the monitoring occasions used for PDCCH blind detection. The WTRU may partition a set of monitoring occasions for a slot into a plurality of subsets. The WTRU may select one of the plurality of subsets for performing PDCCH monitoring. The WTRU may select one of the plurality of subsets based upon an indication of a subset of monitoring occasions received in the DCI. In an example, the WTRU may receive two configurations for the duration of consecutive slots over which the WTRU may monitor for PDCCH. For each slot, depending upon whether the total number of monitored PDCCH candidates and non-overlapped CCEs for the slot exceed a maximum number of blind detections for the slot, one or the other of the two configurations for duration of monitored PDCCH candidates may be employed for the slot. The WTRU may receive one or more, e.g., two, configurations for monitoring periodicity. Depending upon whether the total number of monitored PDCCH candidates and non-overlapped CCEs per slot exceed a maximum number of blind detections, one or the other of the two configurations for monitoring periodicity may be employed.

A WTRU may be configured to adapt an active subset of PDCCH candidates for use in performing PDCCH blind detection. A WRTU may be configured to partition a search space or set of search spaces into subsets of PDCCH candidates. The WTRU may monitor one or more but not all, e.g., a subset, of PDCCH candidates at each monitoring occasion. The subset of PDCCH candidates to be monitored for each search space set may be dynamically communicated to the WTRU by a DCI. The WTRU may autonomously select a subset of PDCCH candidates within a configured search space set when the total number of monitored PDCCH candidates per slot exceeds a configured maximum number of blind detections per slot.

Systems and implementations are described herein that may be used for redundant data transport using multiple PDSCHs. A WTRU may be configured to schedule multiple PDSCHs carrying the same data using a single DCI. Multiple PDSCHs on different component carriers or bandwidth parts (BWPs) may be scheduled with the single DCI. Multiple PDSCHs may be scheduled over multiple beams and/or transmission reception points (TRPs) using the single DCI.

A WTRU may also be configured to schedule multiple PDSCHs with multiple DCIs. For example, a WTRU may be configured using multiple DCIs to receive two or more PDSCHs that carry the same data. The WTRU may receive two or more PDCCHs that carry repetitions of the same DCI that is used to schedule each PDSCH.

The systems and implementations described herein may be adopted to provide various types of wireless services including, for example, ultra-reliable low-latency communication (URLLC) services which may have error rates as low as, for example, $10^{-6}$ and latencies as low as, for example, a fraction of a slot.

This Summary is provided to introduce a selection of concepts in a simplified form that are further described herein in the Detailed Description. This Summary is not intended to limit the scope of the claimed subject matter. Other features are described herein.

BRIEF DESCRIPTION OF THE DRAWINGS

A more detailed understanding may be had from the following description, given by way of example in conjunction with the accompanying drawings wherein.

DETAILED DESCRIPTION

Techniques are disclosed for detecting PDCCH. A WTRU may be configured to adaptively select for a slot in a downlink channel one of a plurality of monitoring patterns that may be used to detect a PDCCH. A WTRU may be configured to limit or restrict the monitoring occasions used for PDCCH blind detection. A WTRU may be configured to adapt an active subset of PDCCH candidates for use in performing PDCCH blind detection.

Techniques are disclosed for redundant data transport using multiple PDSCHs. For example, a WTRU may receive a single DCI which specifies a schedule for multiple PDSCHs carrying the same data. The PDSCHs may be scheduled in the same slot or over different slots, on different component carriers or bandwidth, and on multiple beams and/or TRPs. The multiple PDSCHs carrying redundant data sets may also be scheduled using multiple DCIs.

Figure 1A:
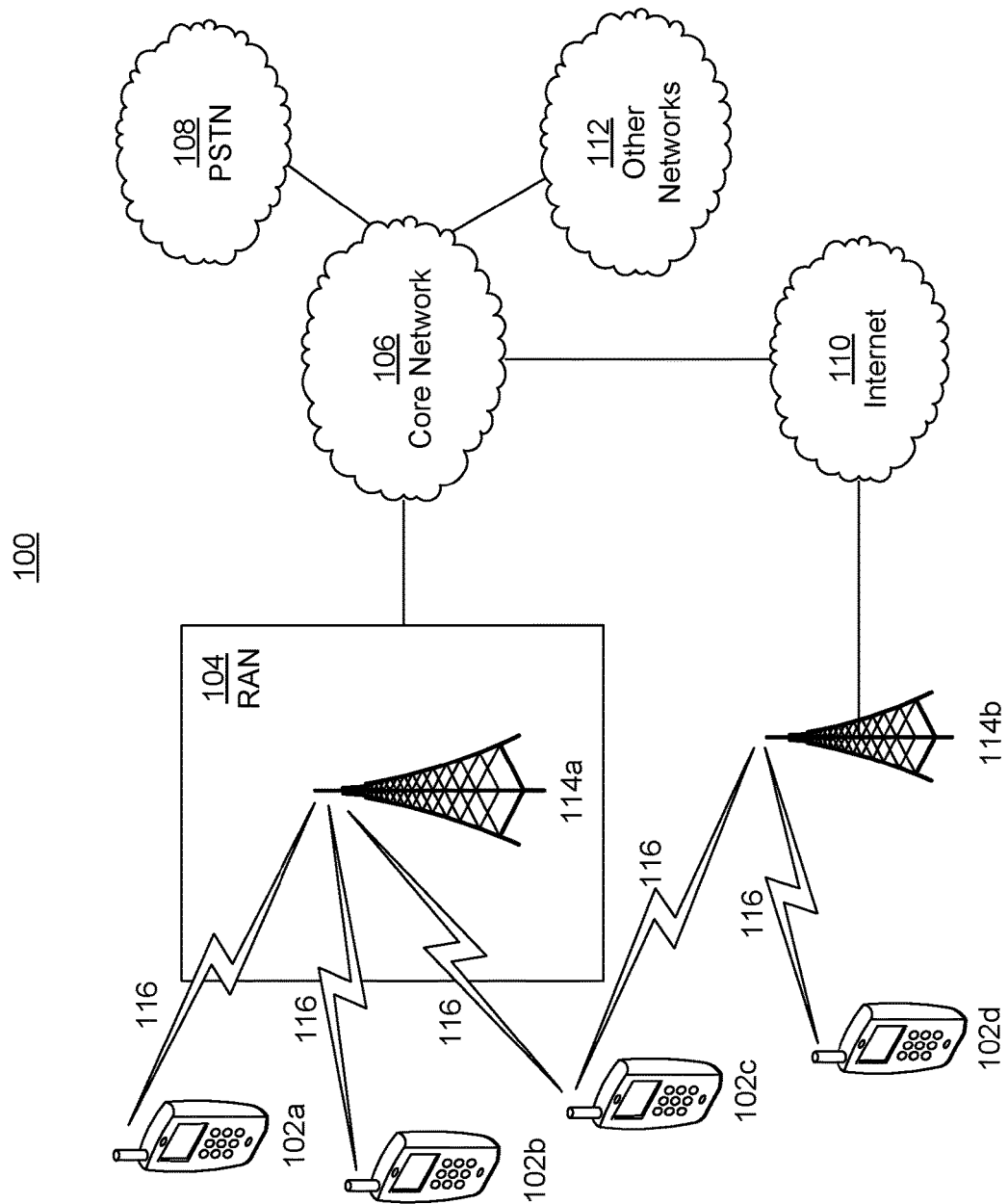
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
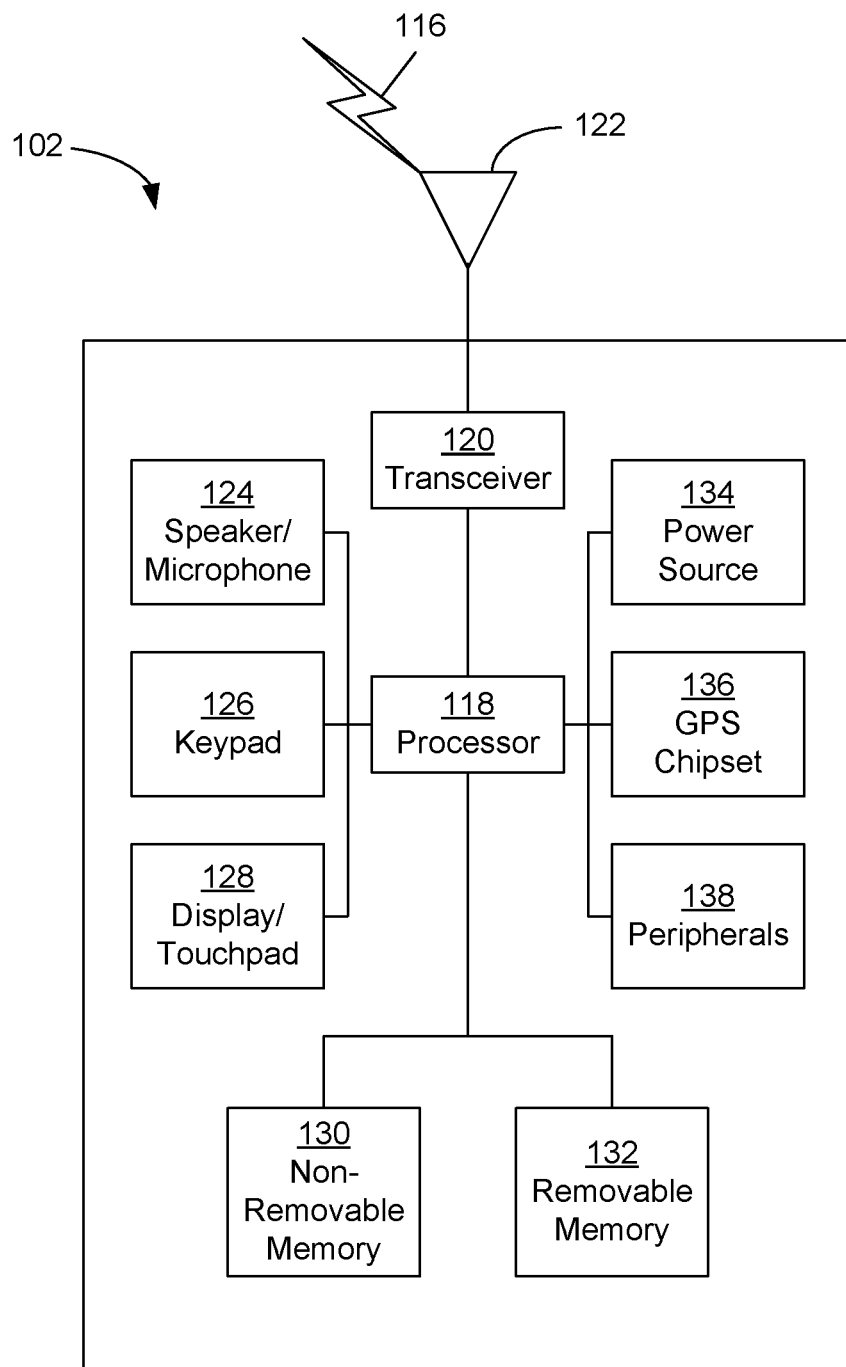
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
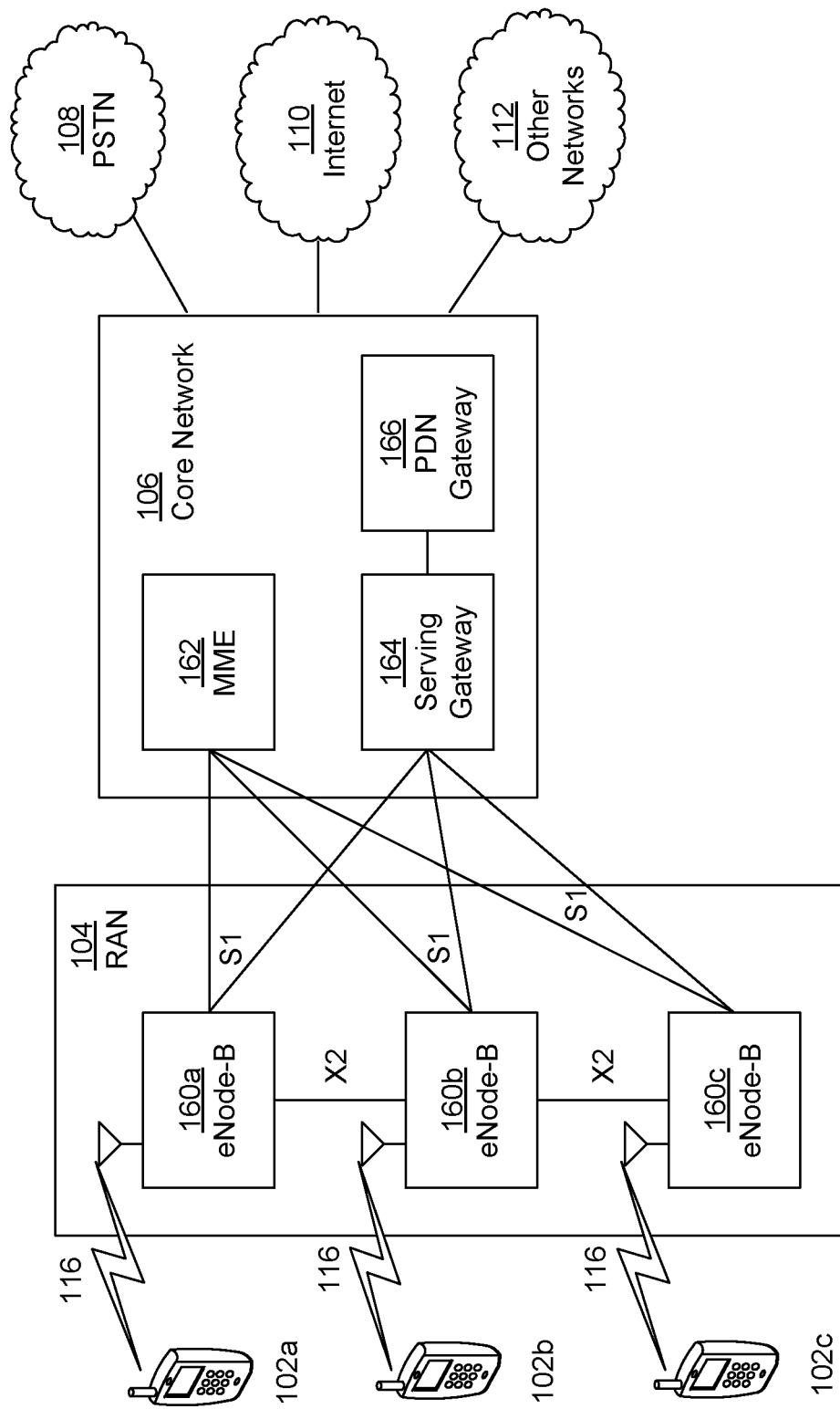
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11ad, 802.11af, 802.11ah, 802.11ax, 802.11ay, and 802.11be, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
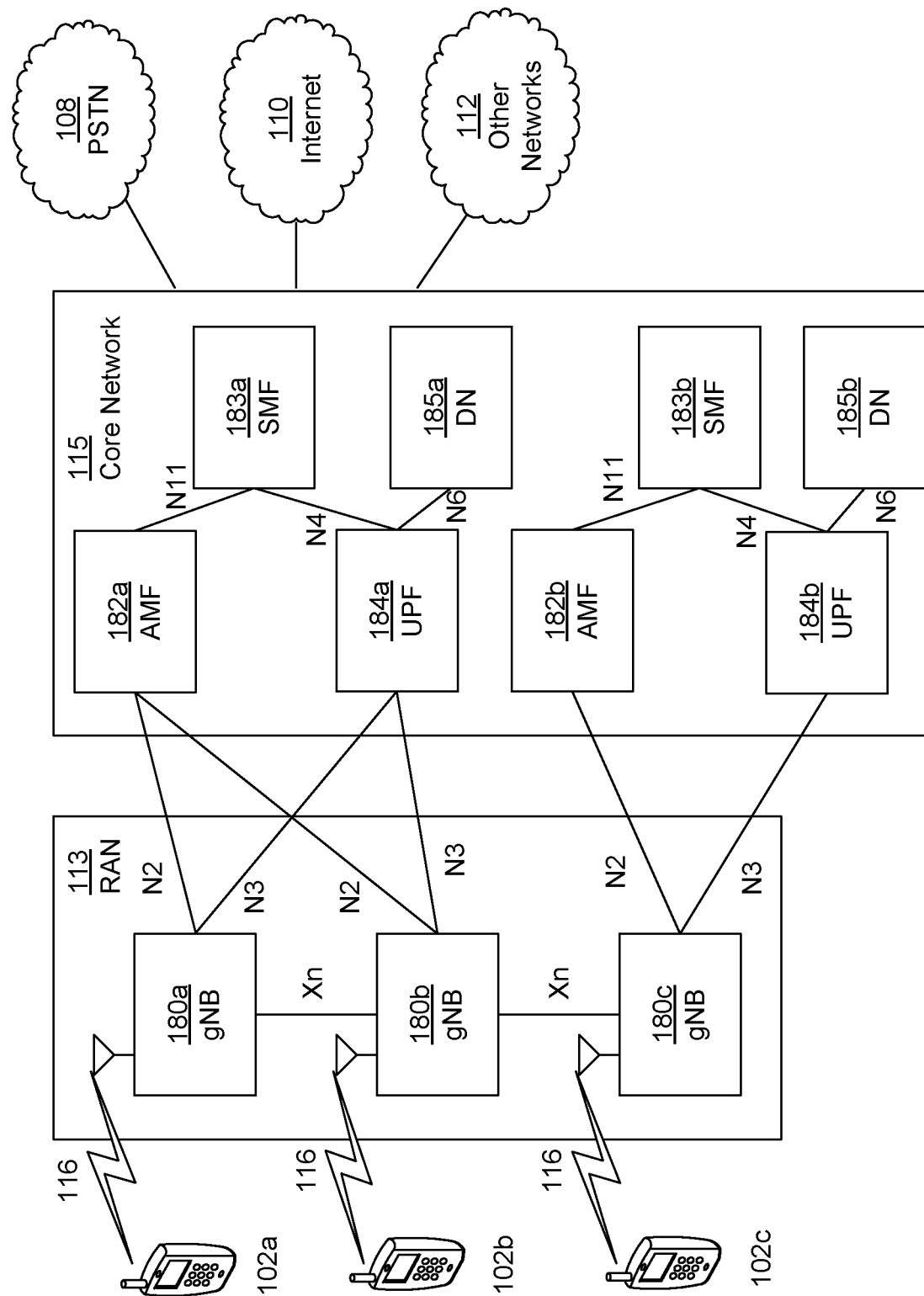
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Techniques for detecting a PDCCH on WTRUs such as those described in FIG. 1 are described herein. For example, processing is disclosed for a WTRU to adaptively select for a slot in a downlink channel one or more of a plurality monitoring patterns that may be used to detect a PDCCH. A WTRU may be configured to limit or restrict the monitoring occasions used for PDCCH blind detection. A WTRU may be configured to adapt an active subset of PDCCH for use in performing PDCCH blind detection.

In 5G NR, a Resource Element Group (REG) may be used as a building block, which may be the smallest building block, for PDCCH. An REG may include (e.g., only include) 12 resource elements (REs) on an OFDM symbol in the time domain. An REG may include a resource block (RB) in the frequency domain. In an REG, a first set of (e.g., 9) REs may be used for control information and/or a second set of (e.g., 3) REs may be used for demodulation reference signal (DMRS). Multiple REGs (e.g., 2, 3, or 6 REGs), which may be adjacent in time and/or frequency domains, may form an REG bundle. The bundle of REGs may use a same precoder and/or their DMRSs may be used together for channel estimation. Six REGs (e.g., in the format of 1, 2, or 3 REG bundles) may form a Control Channel Element (CCE), which may serve as the smallest possible PDCCH. A PDCCH may include one or multiple CCEs (e.g., 1, 2, 4, 8, or 16 CCEs). The number of CCEs for a PDCCH may be referred to herein as the aggregation level (AL) of the PDCCH.

REG bundles may be mapped. The mapping can be performed using multiple modes (e.g., two different modes) including interleaved and non-interleaved. In non-interleaved mapping, consecutive REG bundles, which may be adjacent in frequency, may form a CCE and multiple CCEs, which may be adjacent in frequency, may form a PDCCH. In interleaved mapping, REGs may be interleaved (e.g., permuted) before being mapped to CCEs. This may result in non-adjacent (e.g., generally non-adjacent) REG bundles in a CCE and/or non-adjacent CCEs in a PDCCH.

A Control Resource Set (CORESET) may be configured by its frequency assignment (e.g., as chunks of 6 RBs), by the length of time (e.g., 1-3 OFDM symbols), by the type of REG bundles, and/or by the type of mapping from REG bundles to CCEs (e.g., whether the mapping is interleaved or non-interleaved). A bandwidth part (BWP) may comprise three CORESETs (e.g., up to 3 CORESETs). For example, 12 CORESETs may be included in 4 possible bandwidth parts.

A WTRU may be assigned with a set of PDCCH candidates to be monitored during the detection (e.g., blind detection) of PDCCH. Such a set of PDCCH candidates may be called a search space or a set of search spaces (e.g., for multiple aggregation levels). A search space may correspond to a set of CCEs, and when combined with applicable aggregation levels, may correspond to a set of PDCCH candidates. A set of search spaces may be configured based on its associated CORESET, on the number of candidates with each aggregation level, and/or on monitoring occasions. The monitoring occasions may be determined based on monitoring periodicities (e.g., in terms of slots), monitoring offsets, and/or monitoring patterns. Patterns of symbols, which may include all possible patterns of symbols, inside a slot may be represented using a number of bits (e.g., 14 bits). A monitoring pattern may indicate a first symbol(s) of a CORESET within a slot for PDCCH monitoring.

A WTRU may perform blind decoding of a DCI on the PDCCH by performing a number of decoding attempts using different combinations of CCEs for each applicable aggregation level (AL) within a search space, possibly up to all possible combinations of consecutive CCEs for a given AL for the search space. For each combination, the WTRU may perform decoding attempts for each applicable DCI format, where DCI formats may or may not be of the same size. Blind decoding complexity may reflect, for example, to such decoding attempts for a given DCI size or the total number of blind decodes over all search spaces. For a given PDCCH monitoring occasion, the blind decoding complexity may increase as a function of the number of CCEs for the search space, the number of applicable aggregation levels, and/or the number of applicable DCI size(s). In 5G NR, such blind decoding attempts may correspond to a PDCCH candidate.

One use case scenario for 5G NR is ultra-reliable low-latency communications (URLLC). In URLLC, error rates as low as, for example, $10^{-6}$ and latencies as low as a fraction of a time slot may be possible.

Different techniques may be used to improve the reliability of downlink control channel. These techniques may include, for example, the use of compact DCI and/or repetition of PDCCH which may involve repeating DCI over two or more PDCCHs. In PDCCH repetition, a WTRU may decode the repeated versions of the PDCCH separately or the WTRU may decode them together, e.g., before checking CRC.

Control and data may be repeated in certain use case scenarios such as, for example, in Machine Type Communications (MTC), in order to increase the coverage of downlink communication between a gNB and a WTRU. In this approach, downlink data may be repeated over two or more PDSCHs and the corresponding control information, which may schedule these PDSCHs, may be repeated in two or more PDCCHs.

PDCCH blocking may be avoided or its probability may be reduced and PDCCH assignment may be made more flexible using implementations described herein. The pool of possible PDCCH candidates that may be assigned at a monitoring occasion may be increased. Such an increase may lead to an increase in the number of PDCCH blind decoding operations performed at a WTRU. A decision of whether to allow an increase in the number of blind decoding operations and/or an increase in the number of associated CCEs may be made for all or some of the WTRUs, for example, based on the respective categories and/or capabilities of the WTRUs. Limitations may be imposed on the number of blind decoding operations that may be performed by a WTRU, and/or on the number of CCEs that may be covered by a monitored PDCCH candidate. The implementations described herein may improve the PDCCH scheduling flexibility while satisfying such limitations.

By applying one or more of the implementations described herein, the reliability of downlink control channel and/or data channels may be increased to support higher reliability and/or lower latency in the downlink. The block error rate for PDCCH and/or PDSCH may be reduced in order to, for example, achieve high reliability.

A reference symbol may be used herein to denote a symbol such as a complex number. The complex number may be fixed, known, and/or used as a pilot. A reference signal may be used herein to denote a time domain signal that may be generated after processing a reference symbol. For example, in OFDM, reference symbols may include complex numbers that may be fed into an inverse discrete Fourier transform (IDFT) block while a reference signal may include the output of the IDFT block. Downlink control information (DCI) may include a set of bits that may be transmitted over a PDCCH for a user or a group of users. A resource element (RE) may include an OFDM symbol on a subcarrier, and a resource element group (REG) may refer to a group of REs that may be used as building blocks of a control channel element (CCE).

A CCE may be used to assign resource elements to a user. Multiple REGs, which may be adjacent REGs in time and/or frequency, may be grouped together and their associated precoder may be the same. Such a group of REGs may be called an REG bundle. NR-REG, NR-CCE, and NR-PDCCH may be used herein interchangeably with REG, CCE, and PDCCH. WTRUs may be used interchangeably with users. A gNodeB may be referred to as a gNB and vice versa. A control resource set (CORESET) may refer to a set of resource elements used for a downlink control channel. A CORESET may be configured based on its frequency resources, its length in time (e.g., in terms of symbols), and/or the type of its REG bundles. A search space or a set of search spaces may comprise a set of PDCCH candidates that may be monitored by a WTRU or a group of WTRUs during the detection (e.g., blind detection) of PDCCH. All possible locations for the PDCCH may be referred to as a search space and each of the possible locations may be referred to as a PDCCH candidate.

PDCCH detection, which may be referred to as blind detection of PDCCH, may be made adaptive. The pool of possible PDCCH candidates for blind decoding at a WTRU, which may be used for URLLC, for example, may be dynamically adapted, per each monitoring occasion, such that the flexibility of PDCCH assignment may be increased without increasing the complexity of blind detection.

Adaptive PDCCH detection may be realized by adapting monitoring patterns. A PDCCH monitoring pattern within a slot may indicate one or more first symbol(s) of a control resource set within a slot that may be used for PDCCH monitoring. A WTRU may be configured with more than one PDCCH monitoring pattern for a slot or for multiple slots by higher layer. A configured monitoring pattern may be associated with a different number of PDCCH candidates for monitoring and/or with non-overlapped CCEs per slot. For a given slot/mini-slot, a WTRU may receive (e.g., explicitly receive) a monitoring pattern indicator (MPI) in the DCI, MAC, and/or higher layer configuration. The MPI may indicate an active monitoring pattern among the configured monitoring pattern(s) of the WTRU. Using this approach, the total number of monitored PDCCH candidates and/or the total number of non-overlapped CCEs per slot/mini-slot may be adaptively adjusted so as to not exceed the configured maximum number of blind detections per slot/mini-slot and/or may exceed the capabilities of the WTRU.

In an example, a WTRU may receive a first PDCCH monitoring pattern indicating the indices of even-numbered symbols within a slot that may be used as the first symbols of a control resource set for receiving the respective PDCCH candidates. Such a monitoring pattern may appear as follows: [0,1,0,1,0,1,0,1,0,1,0,1]. The WTRU may receive a second PDCCH monitoring pattern indicating the indices of odd-numbered symbols within a slot that may be used as the first symbols of a control resource set for receiving the respective PDCCH candidates. Such a monitoring pattern may appear as follows: [1,0,1,0,1,0,1,0,1,0,1,0].

A WTRU may determine the bitwidth for an MPI based on the total number of configured monitoring patterns. For example, if the number of configured monitoring patterns is two, the WTRU may assume that the bitwidth of the MPI is one bit. If the number of configured monitoring patterns is between 3 and 4, the WTRU may assume that the bitwidth of the MPI is two bits. If the number of configured monitoring patterns is n, the WTRU may assume that the bitwidth is ceiling ($\log_2$ n) where ceiling (x) is the smallest integer greater than or equal to x. In the case of MPI transmission in DCI, if a WTRU is not configured with multiple monitoring PDCCH patterns, the WTRU may ignore the bit field in DCI. The DCI carrying MPI may be transmitted, for example, in a control resource set at the beginning of a slot (e.g., the first 2-3 symbols), in control resource set index 0, and/or in search space index 0.

A WTRU may autonomously determine (e.g., without explicit signaling) which one or more of the configured PDCCH monitoring patterns should be used. In examples, when the total number of monitored PDCCH candidates and/or the total number of non-overlapped CCEs per slot/mini-slot of the first monitoring pattern exceed the configured maximum number of blind detections per slot/mini-slot, the WTRU may consider the second configured PDCCH monitoring pattern (e.g., use the second monitoring pattern if the total number of monitored PDCCH candidates and/or the total number of non-overlapped CCEs per slot/mini-slot of the second monitoring pattern do not exceed the configured maximum number of blind detections per slot/mini-slot). When the total number of monitored PDCCH candidates and/or the total number of non-overlapped CCEs per slot/mini-slot of the first monitoring pattern does not exceed the configured maximum number of blind detections per slot/mini-slot, the WTRU may use the first configured PDCCH monitoring pattern.

A WTRU may determine the monitoring pattern in a given slot from a plurality of configured PDCCH monitoring patterns based on a function. The function may use one or more of the following parameters: slot index (defining, for example, a particular slot in a plurality of slots), PDCCH monitoring periodicity, PDCCH monitoring offset, and/or PDCCH monitoring duration.

Figure 2:
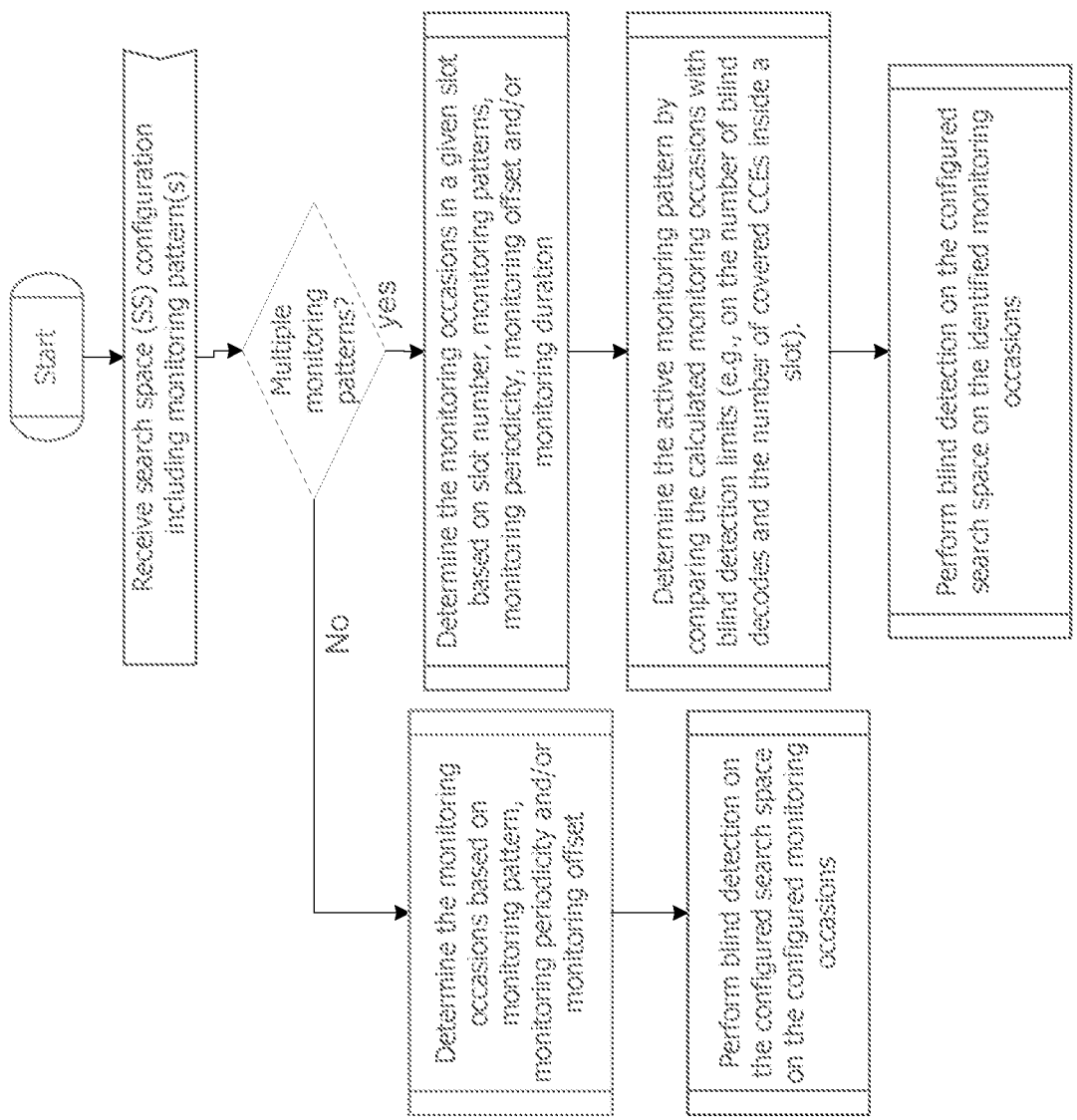
FIG. 2 is a diagram illustrating an example of autonomously selecting among configured PDCCH monitoring patterns.

FIG. 2 depicts example processing for autonomously selecting among configured PDCCH monitoring patterns. As shown, multiple monitoring patterns may be configured for a WTRU as an ordered set. This configuration may be provided using bits associated with the monitoring pattern configuration. The configuration may include or may be provided together with a flag bit indicating that a multiple-pattern case is applicable. In such a multiple-pattern case, the WTRU may identify the ordered set of configured monitoring patterns based on the monitoring pattern bits and/or using a pre-defined mapping, which may be specified as a table. The WTRU may determine an active monitoring pattern (and/or the corresponding monitoring occasions) based on the first pattern (e.g., in the ordered set of monitoring patterns) that satisfies blind detection limits. As described herein, such blind detection limits may be reflected through the number of blind decoding operations and/or the number of covered CCEs allowed inside a slot.

A WTRU may perform PDCCH monitoring according to a second PDCCH monitoring pattern (e.g., when a first monitoring pattern exceeds blind detection limits and a second monitoring pattern does not exceed blind detection limits). The second PDCCH monitoring pattern may indicate the indices of fewer symbols within a slot that may be used as the first symbol(s) of a control resource set for receiving respective PDCCH candidates (e.g., the first monitoring pattern may indicate the indices of more symbols than are supported by blind detection limits and the second monitoring pattern may indicate the indices of less symbols than are supported by blind detection limits). For example, a first PDCCH monitoring pattern may include every other symbol within the slot as the first symbols of a control resource set within a slot for PDCCH monitoring, which may be represented as [1,0,1,0,1,0,1,0,1,0,1,0]. A second PDCCH monitoring pattern may include (e.g., only include) first and seventh symbols of the slot as the first symbols of the control resource set within a slot for PDCCH monitoring, which may be represented as [1,0,0,0,0,0,0,1,0,0,0,0,0,0].

In examples, the WTRU may hop from one monitoring pattern to another according to a fixed sequence which may be configurable. The WTRU may change the applicable monitoring pattern after a given period of time which also may be configurable. For each monitoring pattern, the WTRU may decode PDCCH candidates up to a maximum number which may be configurable. The start of each period and the period corresponding to the first pattern in the sequence may be based on system timing information such that the network and the WTRU may be synchronized in terms of what pattern is being used by the WTRU for a given period. If discontinuous reception (DRX) is configured, the WTRU may apply the first monitoring pattern in the period that corresponds to the first monitoring occasion of the start of an active DRX period (e.g., the start of the DRX on duration period). A network implementation may configure different WTRUs with different hopping sequences for PDCCH monitoring patterns, e.g., such that PDCCH blocking may be reduced and multiplexing flexibility may be increased.

Figure 3:
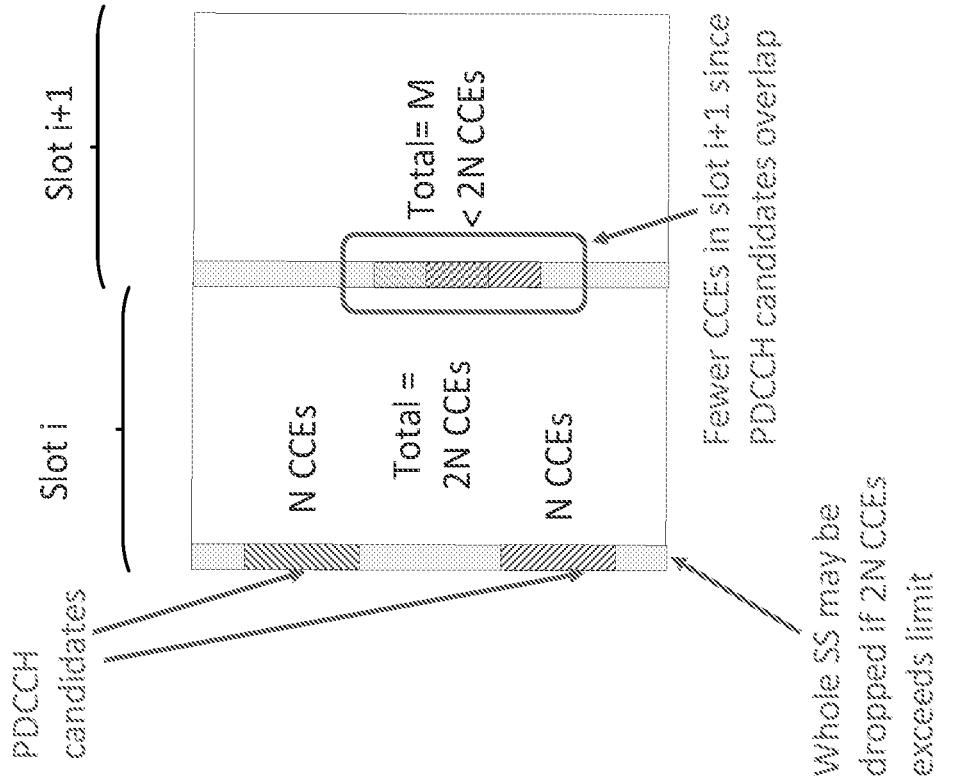
FIG. 3 is a diagram illustrating example PDCCH candidates.

FIG. 3 illustrates the use of PDCCH candidates in slots. A first slot, Slot i, and a second slot, Slot i+1, are shown. In Slot i, PDCCH candidates are located across, or appear in or cover, two sets of N CCEs. Accordingly, with respect to Slot i, the total number of CCEs that may potentially be used for PDCCH detection may be 2N CCEs. The location of PDCCH candidates may vary by slot. Accordingly, as shown in Slot i+1, the CCEs that may be used for PDCCH detection overlap with each other, which results in a fewer total number of CCEs (<2N) being applied to PDCCH detection. PDCCH detection in Slot i+1 uses fewer CCEs than Slot i. If 2N CCEs exceeds a limit for CCEs, without non-adaptive monitoring pattern processing as described herein, the search space for Slot i may be dropped.

Figure 4:
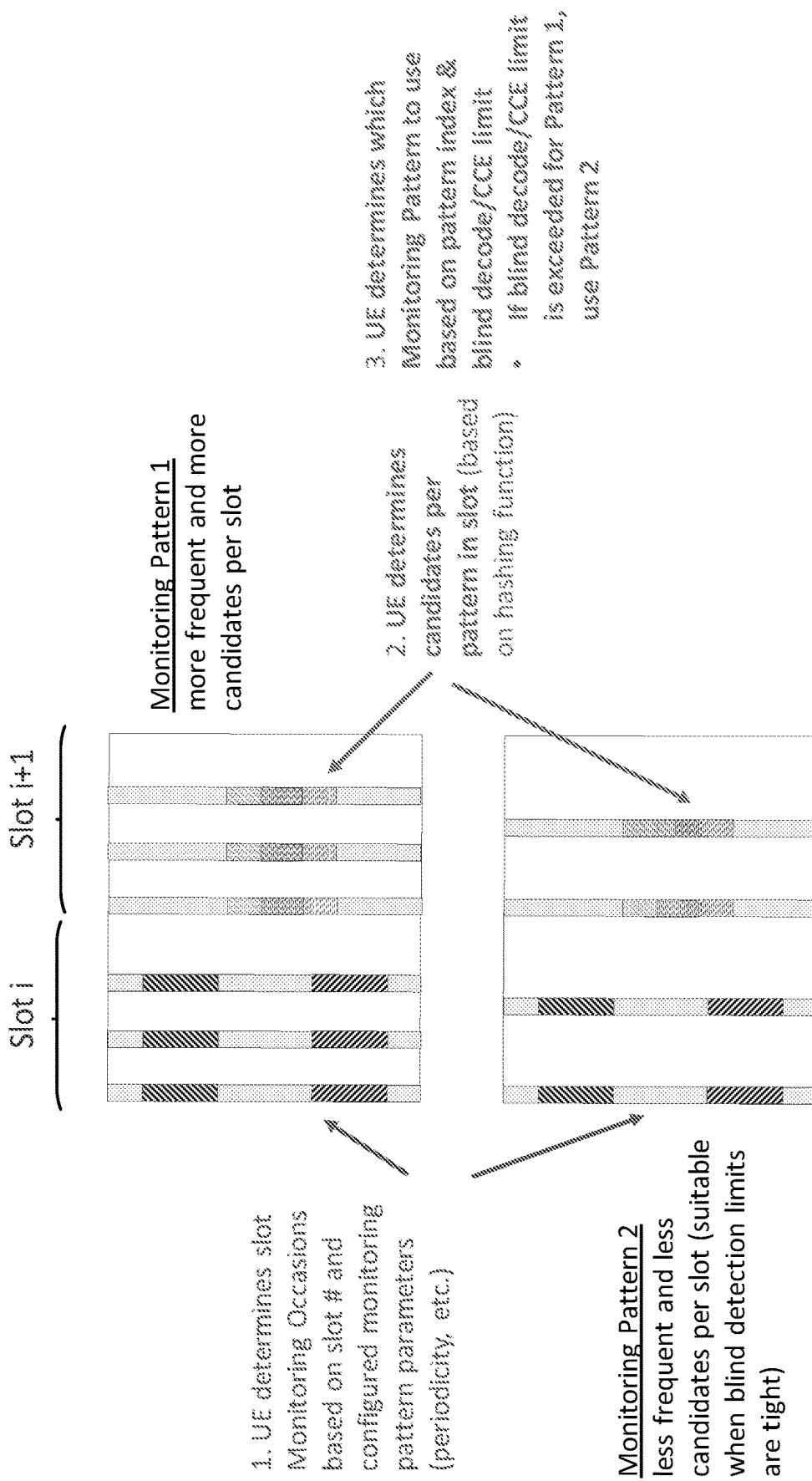
FIG. 4 is a diagram illustrating example PDCCH monitoring patterns.

FIG. 4 illustrates adaptive selection of a monitoring pattern from a plurality of potential patterns for a slot. Two slots, Slot i and Slot i+1, are depicted. For each slot, two monitoring patterns, Monitoring Pattern 1 (shown toward the top of the FIG. 4) and Monitoring Pattern 2 (shown toward the bottom of the FIG. 4), and their associated monitoring occasions located in CCEs are depicted. The WTRU may determine the location of monitoring occasions and corresponding CCEs for each monitoring pattern based on the slot number and the monitoring pattern parameters such as, for example, periodicity, etc. As shown, the monitoring occasions and the corresponding PDCCH candidates and CCEs are greater in number and more frequently occurring in connection with Monitoring Pattern 1 than with respect to Monitoring Pattern 2. The WTRU may autonomously determine which of the two (or more) monitoring patterns to use based on detection limits such as the number of blind detections and/or CCE limits that may apply. For example, with respect to Slot i, Monitoring Pattern 1 involves use of 6N CCEs for PDCCH detection and Monitoring Pattern 2 involves use of 4N CCEs for PDCCH detection. If the CCE detection limit were 5N, the WTRU may select to use Monitoring Pattern 2 rather than Monitoring Pattern 1 because the number of CCEs used (i.e., 4) is within the limit (i.e., 6). With respect to Slot i+1, the WTRU may select to use Monitoring Pattern 1, as only 4.5 N CCEs are used which is less than the 5N CCE limit, and, is first in the ordered set of monitoring patterns to be considered.

Adaptive PDCCH blind detection may involve restricting monitoring occasions. A WTRU may determine a PDCCH monitoring occasion based on PDCCH monitoring periodicities, based on PDCCH monitoring offsets, and/or based on PDCCH monitoring patterns within a slot. The set of monitoring occasions (e.g., for PDCCH) may be partitioned into a number of subsets of monitoring occasions. For a slot and/or a mini-slot (or during each monitoring periodicity), one (e.g., only one) subset of monitoring occasions may be used by the WTRU for monitoring PDCCH. In an example where there may be five available monitoring occasions, two or three of the monitoring occasions, for example, may be included in a subset. By restricting the WTRU to monitor a subset of monitoring occasions, the number of PDCCH blind decoding operations may be reduced at the WTRU. The subset of the monitoring occasions to be used by the WTRU may be indicated. For example, the subset of monitoring occasions may be dynamically indicated by DCI using a monitoring occasion indicator (MOI).

For a given search space set, a WTRU may receive multiple (e.g., two) configurations from a higher layer indicating the duration of consecutive slots or mini-slots over which the WTRU may monitor PDCCH. The durations may be designated, for example, T1 and T2. Assuming the duration of a first configuration is larger than the duration of a second configuration (e.g., T1>T2), a WTRU may behave as the follows. When the total number of monitored PDCCH candidates and/or the total number of non-overlapped CCEs per slot/mini-slot does not exceed a configured maximum number of blind detections per slot/mini-slot or the capability of the WTRU, the WTRU may monitor PDCCH for a given search space set for T1 consecutive slots/mini-slots. When the total number of monitored PDCCH candidates and/or the total number of non-overlapped CCEs per slot/mini-slot exceed the configured maximum number of blind detections per slot/mini-slot or the capability of the WTRU, the WTRU may monitor PDCCH for a given search space set for T2 consecutive slots/mini-slots and may not monitor PDCCH for the next T1-T2 consecutive slots/mini-slots.

For a given search space set, a WTRU may receive multiple (e.g., two) configurations from a higher layer indicating PDCCH monitoring periodicity which may be designated, for example, K1 and K2. Assuming the PDCCH monitoring periodicity of a first configuration is longer than the PDCCH monitoring periodicity of a second configuration (e.g., K1>K2), a WTRU may behave as follows. When the total number of monitored PDCCH candidates and/or the total number of non-overlapped CCEs per slot/mini-slot does not exceed the configured maximum number of blind detections per slot/mini-slot or the capability of the WTRU, the WTRU may monitor PDCCH according to the longer monitoring periodicity of K1. When the total number of monitored PDCCH candidates and/or the total number of non-overlapped CCEs per slot/mini-slot exceed the configured maximum number of blind detections per slot/mini-slot or the capability of the WTRU, the WTRU may monitor PDCCH according to the shorter monitoring periodicity of K2.

Adaptive PDCCH blind detection may involve adapting an active subset of PDCCH candidates. The configured search space (or set of search spaces) may be partitioned into a number of subsets of PDCCH candidates and a WTRU may monitor (e.g., only monitor) one subset of PDCCH candidates at a monitoring occasion. By restricting the WTRU to monitor only a subset of PDCCH candidates in a search space set, the number of PDCCH blind decoding operations may be reduced at the WTRU. The PDCCH candidates determined using a hashing function on a given monitoring occasion may be designated m=0, 1, . . . , N, N+1, . . . , M, where M is the total number of PDCCH candidates a WTRU is configured to monitor for a configured search space set. PDCCH candidates m=0, 1, . . . N where N<M may be considered a first search space subset and PDCCH candidates m=N+1, . . . , M may be considered a second search space subset. PDCCH candidates m that are odd numbers may be considered a first search space subset and PDCCH candidates m that are even numbers may be considered a second search space subset.

When a WTRU determines that there are multiple monitoring occasions in a given slot, the WTRU may monitor different subsets of PDCCH candidates of a configured search space set in different monitoring occasions, for example, to make sure that the total number of monitored PDCCH candidates and/or the total number of non-overlapped CCEs per slot does not exceed the configured maximum number of blind detections per slot. Assuming that the PDCCH monitoring pattern associated with a search space set include symbol indices of n1 and n2 as the first symbols of the control resource set within a slot for PDCCH monitoring (e.g., two monitoring occasions within a slot), the WTRU may monitor the PDCCH candidates within a first search space subset on the first monitoring occasion of n1 and may monitor the PDCCH candidates within a second search space subset on the second monitoring occasion of n2.

The subset of PDCCH candidates to be monitored by a WTRU for a search space set may be indicated. For example, the subset of PDCCH candidates to be monitored may be dynamically indicated by a DCI using a search space subset indicator (SSSI). The WTRU may determine the bitwidth for an SSSI field as ceiling(Log 2(S)) bits, where S may denote the number of search space subsets for a DL BWP configured for the WTRU in a serving cell. S may be provided by higher layers. If the WTRU does not support dynamic indication of active subset of search space via DCI, the WTRU may ignore this bit field.

A WTRU may autonomously select a subset of PDCCH candidates within a configured search space set when the total number of monitored PDCCH candidates and/or the total number of non-overlapped CCEs per slot exceeds the configured maximum number of blind detections per slot. The subsets of a search space set may have been previously provided to the WTRU by signaling (e.g., dedicated signaling) from a higher layer. The subsets of a search space set may be provided to a WTRU by a higher layer parameter such as, for example, searchSpaceSubset. The parameter may indicate a bitmap of size S corresponding to the indices of the subsets of the configured search space set within a given DL BWP. For example, the search space subsets 0 and 1 of a configured search space set may be active within the corresponding DL BWP, e.g., [1,1,0,0].

A WTRU may receive the index or indices of deactivated search space subset(s). When the total number of monitored PDCCH candidates and/or the total number of non-overlapped CCEs per slot exceed the configured maximum number of blind detections per slot, the WTRU may deactivate a subset of PDCCH candidates within a configured search space set. The deactivated search space subsets may be indicated via, for example, DCI or higher layer signaling. For example, if DCI indicates search space subset index one, it may be imply that the WTRU does not need to monitor PDCCH candidates associated with search space subset one.

A WTRU may use a pre-configured priority list for search space subsets within a configured search space set when the total number of monitored PDCCH candidates and/or the total number of non-overlapped CCEs per slot exceed the configured maximum number of blind detections per slot. One or more (e.g., all) search space subsets, e.g. search spaces associated with Types 0, 1, 2 and 3 PDCCH common search space, may be prioritized over search space subsets that are within the search space set of, e.g., Type 0A PDCCH, common search space in a given slot. For example, high priority search space subsets may include one or more of the following: Type0-PDCCH common search space; Type1-PDCCH common search space; Type2-PDCCH common search space; Type3-PDCCH common search space; and Type3-PDCCH UE specific search space. Low priority search space subsets may include Type0A-PDCCH common search space. The WTRU may skip monitoring PDCCH candidates in Type0A-PDCCH common search space when the total number of monitored PDCCH candidates and/or the total number of non-overlapped CCEs per slot exceed the configured maximum number of blind detections per slot.

Multiple potential search spaces may be configured for a WTRU. DCI, which may have a small payload, may indicate the active search space for a specific monitoring occasion. The location of the transmitted DCI may be fixed inside a CORESET or may be blindly decoded from multiple candidates. For example, a small DCI may comprise only one bit indicating whether search space set S1 or search space set S2 is currently active within a given slot.

Adaptive PDCCH detection may be realized by adapting the distribution and/or the sequence of PDCCH candidates within a monitoring pattern. In examples, a WTRU may be configured with parameters that control the sequence of PDCCH candidates to decode for a given PDCCH monitoring pattern. Such parameters may be configured per CORESET, per search space, per type of search space and/or per slot. For example, the WTRU may be configured with a CEE index to determine the CEE start index of a given search space (or with an offset therefrom). The WTRU may be configured with a specific sequence (or subset) of aggregation levels (ALs) to determine the PDCCH candidates. The WTRU may be configured with a specific sequence (or subset) of DCI format(s) (or sizes) to determine the PDCCH candidates. Such sequences (or subset) of DCI format(s) (or sizes) may be linked to specific AL(s). The WTRU may be configured with the sequence (or subset) of applicable type(s) of search space for a given pattern. A network implementation may configure different PDCCH monitoring occasions to induce different PDCCH candidates, opportunistically spreading scheduling opportunities for different reliability levels (e.g., based on AL), different purposes (e.g., based on search space types), different scheduling needs (e.g., based on DCI formats) for a given WTRU over a monitoring period to maintain the WTRU's blind decoding complexity within the required limit while maintaining scheduler flexibility. A configuration of sets of patterns may be enabled where most patterns may have multiple CORESETs while supporting spreading aspects of the PDCCH candidates over multiple CORESETs and across slots. For example, for a given WTRU, different CORESETs in a given slot may have PDCCH candidates that correspond to different DCI formats, while different slots may be used for different ALs (or vice-versa). The distribution and/or the sequence of PDCCH candidates for PDCCH detection may be combined with the sequential hopping between different PDCCH monitoring patterns.

Systems and implementations are disclosed for redundant data transport using multiple PDSCHs. Multiple PDSCHs carrying the same data may be scheduled with a single DCI. PDSCH and its associated PDCCH over multiple times, frequencies, and/or spatial resources may be replicated, for example, to enhance the reliability of data and control transmissions. A WTRU may receive a single DCI carrying the scheduling information for multiple PDSCHs that carry the same data. For example, two or more PDSCHs may carry the same Transport Block (TB) and/or two or more PDCCHs may carry the same DCI. A single DCI may carry exactly the same scheduling information for the two or more PDSCHs. Using this approach, PDCCH overhead may be lowered given that in legacy systems each PDSCH may be scheduled with a respective, dedicated DCI.

A WTRU may receive a single DCI which carries scheduling information, which may be different scheduling information, for two or more PDSCHs carrying the same data. The WTRU may determine that one or more of the following fields in the single received DCI are the same for the multiple PDSCHs: MCS; redundancy version; time domain resource assignment; and frequency domain resource assignment.

Where there is PDCCH repetition, a WTRU may interpret one or more of the DCI fields differently for each PDSCH based on the attributes of the corresponding PDCCHs. For example, the WTRU may determine one or more of the following parameters for the first PDSCH explicitly from the DCI: MCS, redundancy version, frequency domain resource assignment, and/or time domain resource assignment. With respect to the second PDSCH, the WTRU may determine parameters implicitly by applying a function using one or more of the following parameters: the index of a first CCE for the PDCCH reception; the index of the CORESET for the PDCCH reception; the index of the search space for the PDCCH reception; the number of CCEs in a control resource set of a PDCCH reception; the index of the first symbol of the CORESET within the slot of a PDCCH reception; the active BWP index; the component carrier index, and/or the frequency shift between the first and second PDSCH transmissions.

Multiple PDSCHs may be scheduled on different component carriers and/or bandwidth parts with a single DCI. Bitfields indicating the bandwidth part and/or the component carrier in DCI Format 1_1 may be interpreted based on an RRC configuration such that the bitfields may indicate a combination of different bandwidth parts (BWPs) or component carriers (CCs). The frequency and/or time assignment of a PDSCH indicated in the DCI may point to multiple PDSCHs, corresponding to the bandwidth parts that are indicated in the bandwidth part combination. For example, if a combination of 1 and 3 is indicated by the BWP-related bits (or the CC-related bits) of the DCI, two PDSCHs may be scheduled with the frequency and/or time assignment indicated by the DCI in bandwidth parts (or component carriers) 1 and 3.

Figure 5:
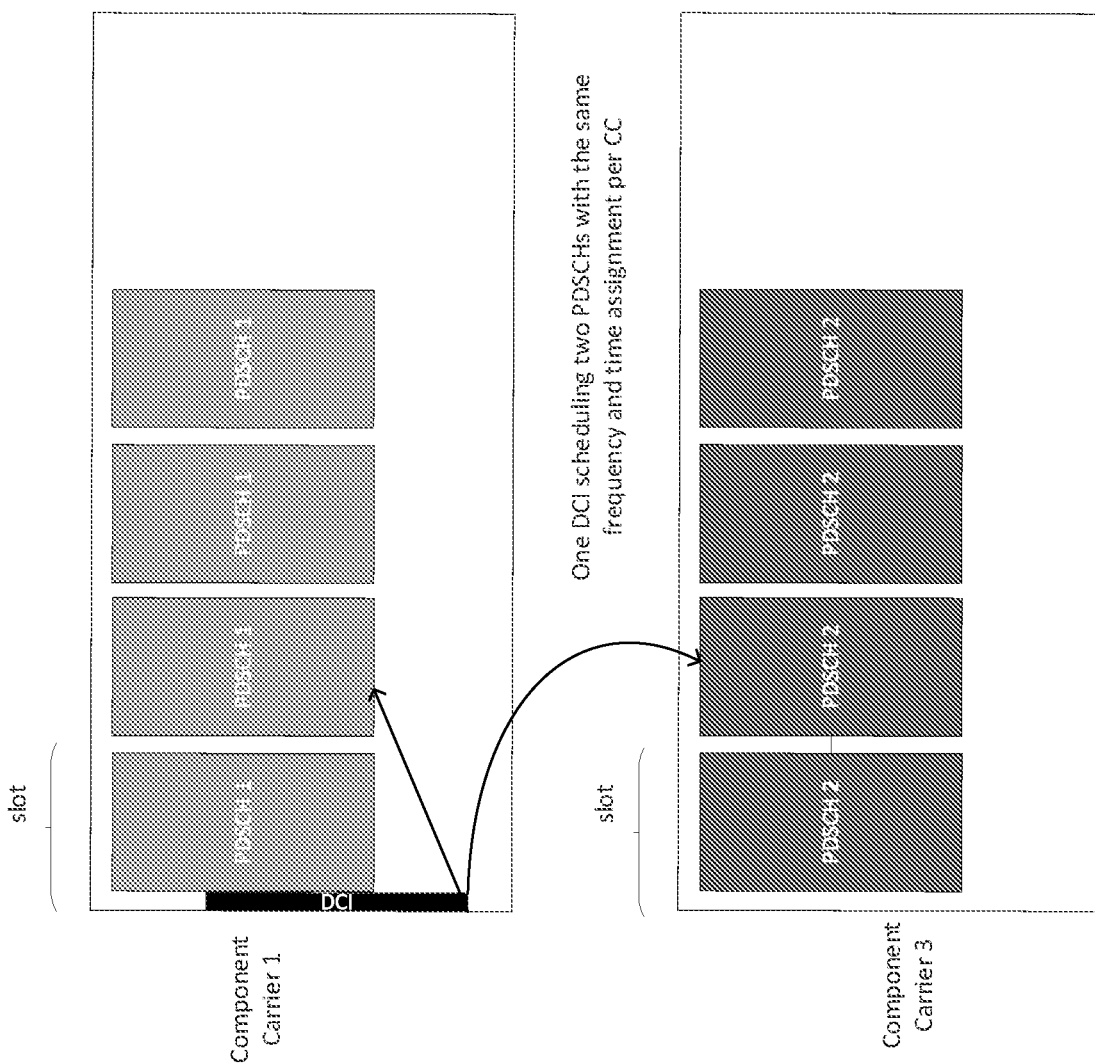
FIG. 5 is a diagram illustrating an example of scheduling multiple PDSCHs on multiple component carriers.

FIG. 5 is a diagram illustrating examples of two PDSCHs (e.g., 1 and 2) scheduled on component carriers 1 and 3, with the same data and same frequency and/or time allocation.

The number of CCs (or BWPs) associated with one DCI (e.g., DCI format 1_1), or whether there is one CC, which may be a default value, or more than one CC, may be indicated explicitly through higher layer signaling (e.g., via a RRC configuration of search space), or may be indicated implicitly based on the number of bits in DCI allocated for indicating the component carrier(s) (or the bandwidth part(s)).

An example interpretation of BWP-related bits in DCI Format 1_1 (e.g., when 4 bits are dedicated to BWP indication) is shown in Table 1:

TABLE 1

Example interpretation of BWP-related (or CC-related) bits of DCI Format 1_1

| BWP-related (or CC-related) bits of DCI Format 1_1 | BWP (or CC) combination for the scheduled PDSCH |
| --- | --- |
| 0000 | 0 |
| 0001 | 1 |
| 0010 | 2 |
| 0011 | 3 |
| 0100 | 0, 1 |
| 0101 | 0, 2 |
| 0110 | 0, 3 |
| 0111 | 1, 2 |
| 1000 | 1, 3 |
| 1001 | 2, 3 |
| 1010 | 0, 1, 2 |
| 1011 | 0, 1, 3 |
| 1100 | 0, 2, 3 |
| 1101 | 1, 2, 3 |
| 1110 | 0, 1, 2, 3 |
| 1111 | — |

The number of BWP-related bits in DCI and/or their interpretation (e.g., via a table such as Table 1) may be configured by RRC or other type(s) of higher layer signaling. In an example, if multiple (e.g., 2) BWP-related bits are allocated for the DCI, their interpretation may be different based on the RRC configuration, as shown in Table 2.

TABLE 2

Example interpretation of BWP-related (or CC-related) bits of DCI based on RRC configuration

| BWP-related (or CC-related) bits of DCI | BWP (or CC) for Single PDSCH (default) | BWP (or CC) combination for PDSCH repetition (when PDSCH repetition with multiple BWPs/CCs is indicated by RRC configuration) |
| --- | --- | --- |
| 00 | 0 | 0, 2 |
| 01 | 1 | 1, 3 |
| 10 | 2 | 0, 1 |
| 11 | 3 | 2, 3 |

Figure 6:
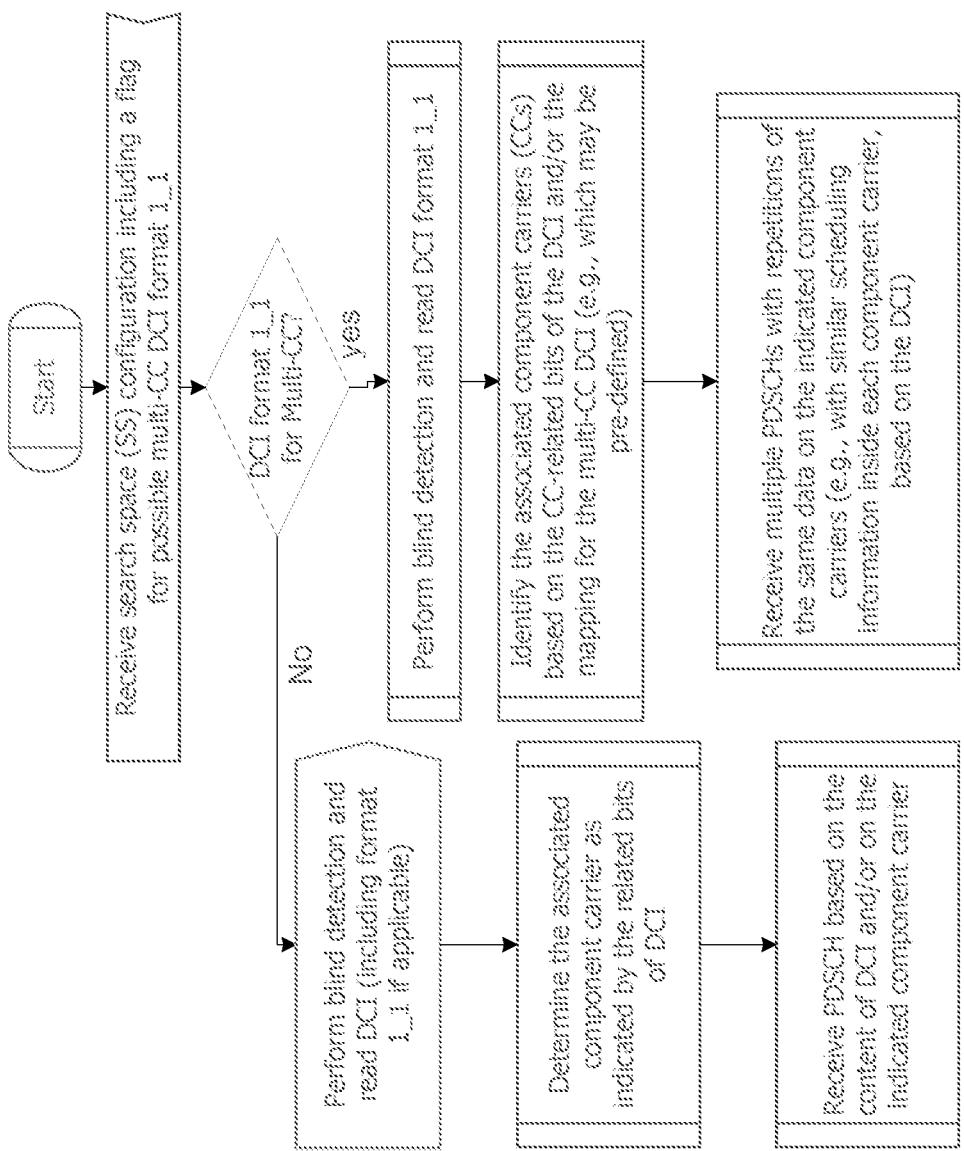
FIG. 6 is a diagram illustrating an example of PDSCH and PDCCH repetition on different component carriers with single DCI.

FIG. 6 depicts example techniques for repetition of PDSCH and PDCCH on different component carriers with single DCI of Format 1_1. Similar techniques may be used for repetition on multiple BWPs, with substitution of bandwidth parts for component carriers.

Figure 7:
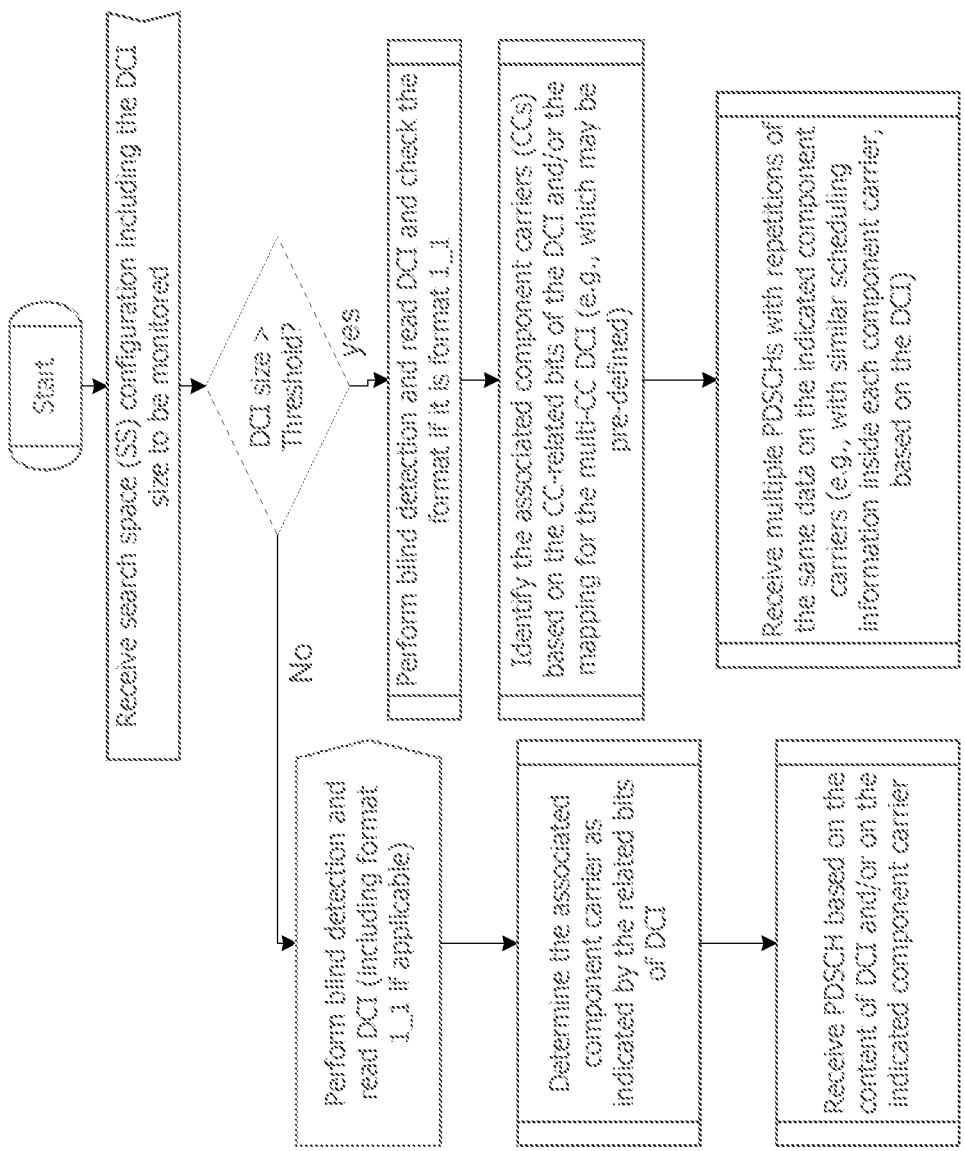
FIG. 7 is a diagram illustrating an example of implicitly determining whether DCI is for multiple components carriers/bandwidth parts.

A WTRU may implicitly conclude that the DCI is for multiple CCs (or BWPs), for example, based on the size of DCI. FIG. 7 depicts example techniques for a WTRU implicitly determining whether DCI is for multiple CCs (or BWPs) based on the size of the DCI. As shown, a WTRU may obtain the size of the DCI to be monitored, for example, through search space configurations.

Multiple PDSCHs may be scheduled over multiple beams and/or TRPs with a single DCI. PDSCH and/or PDCCH may be transmitted over multiple beams or from multiple TRPs (Transmission/Reception Points), for example, to increase the reliability of downlink transmission. A WTRU may receive a single DCI carrying the scheduling information for multiple PDSCHs that carry the same data over multiple beams or multiple TRPs.

A PDSCH may be scheduled with a PDCCH. The beam/TRP associated with a PDSCH may be assumed to be the same as the beam/TRP associated with a corresponding PDCCH. The PDSCHs that repeat the same data may be assumed to have the same time assignment, MCS, and/or frequency assignment relative to the corresponding CC(s)/BWP(s). Under these assumptions (e.g., conditions), a WTRU may determine that the same DCI is used for the scheduling of multiple PDSCHs. A single DCI may be repeated over multiple PDCCHs corresponding (e.g., based on a one-to-one relationship) to the repeated PDSCHs. The WTRU may receive information regarding the use of the same beam/TRP for each PDSCH and its associated PDCCH. The information may be received (e.g., semi-statically) through higher layer signaling (e.g., via RRC configuration).

Figure 8:
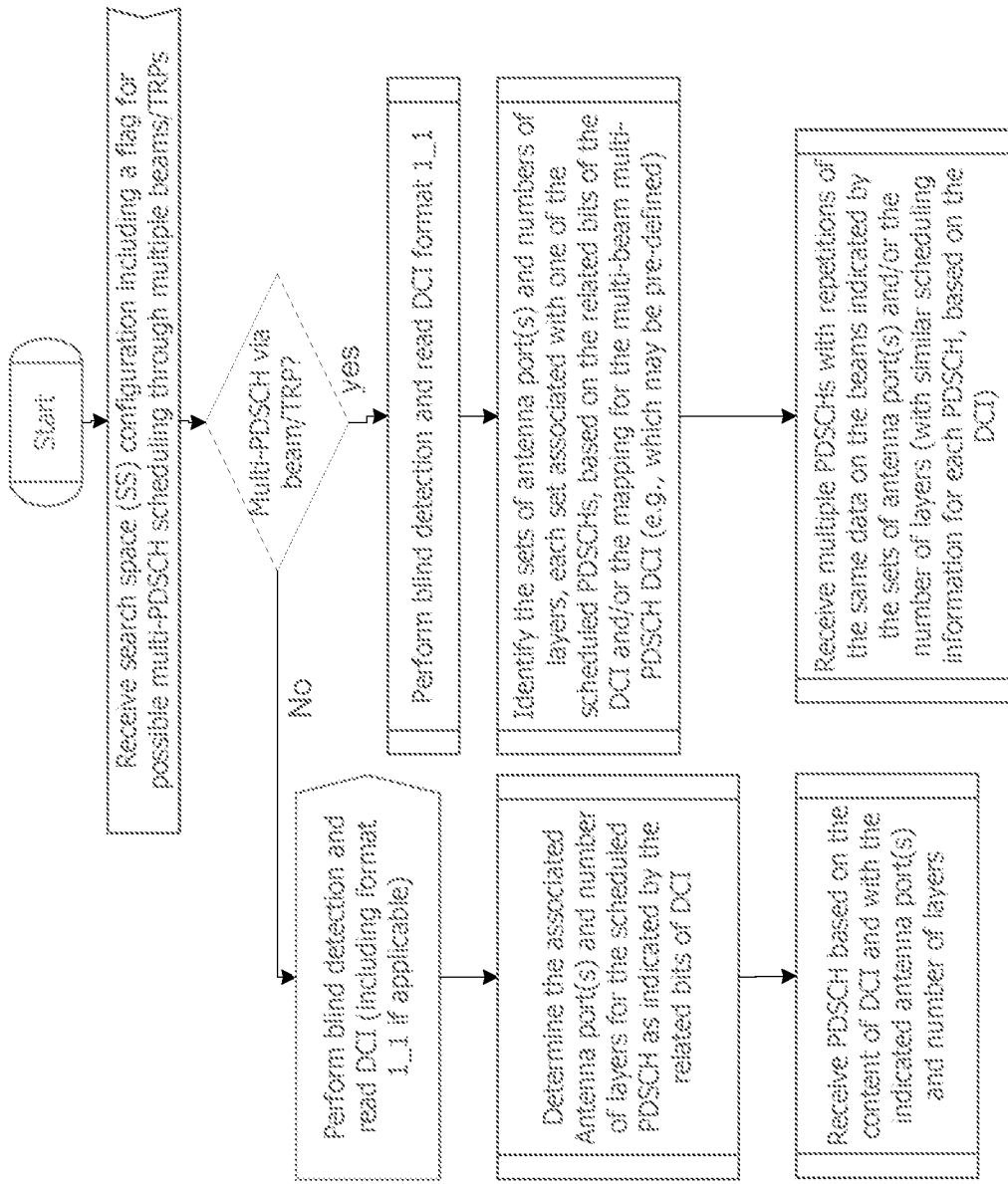
FIG. 8 is a diagram illustrating an example of PDSCH and PDCCH repetition through multiple beams/transmission reception points (TRPs) with one DCI indicating the multiple beams/TRPs.

A WTRU may use certain DCI bits such as, for example, those related to antenna port(s) and/or the number of layers, to determine multiple sets of antenna port(s) and/or layer(s). One or more of the sets of antenna ports and/or layers may correspond to a respective PDSCH. A mapping between the DCI bits (e.g., those related to antenna port(s) and the number of layers) and the multiple sets of antenna port(s) and layer(s) may be predefined (e.g., specified in a table) or may be configured (e.g., semi-statically configured) by RRC (or other higher layer signaling). FIG. 8 depicts example techniques for repetition of PDSCH and PDCCH through multiple beams/TRPs with one DCI indicating multiple beams/TRPs. Multiple PDSCHs carrying the same data may be scheduled with multiple DCIs. A WTRU may receive two or more PDSCHs carrying repetitions of the same data and/or two or more PDCCHs carrying repetitions of the same DCI that schedules each PDSCH. A PDSCH may be scheduled independently from its repetitions. A WTRU may determine the linkage between the PDSCHs scheduled by different DCIs and/or the linkage between the PDCCHs transmitting the same DCI, for example, to realize combined gains while lowering the chance of blind detection. The determination of the linkage may be based on RRC configuration or other type(s) of higher layer signaling. For example, a WTRU may determine from RRC configuration that PDCCH candidates in search spaces S1 and S2 are paired together and that PDSCH1 may be scheduled accordingly. The WTRU may determine from RRC configuration that PDCCH candidates in search spaces S3 and S4 are paired together and PDSCH2 may be scheduled accordingly. The WTRU may determine from RRC configuration that the same data is transmitted on PDSCH1 and PDSCH2.

In this example, the WTRU may obtain the DCI scheduling for PDSCH1 by blind detection over search spaces S1 and S2. The WTRU may obtain the DCI scheduling for PDSCH2 by blind detection over search spaces S3 and S4.

The WTRU may detect and decode data after combining (e.g., via soft combination of) PDSCH1 and PDSCH2.

Reducing the payload size of the PDCCH from 40 bits to, for example, 15 bits may result in an improvement in the link level PDCCH reliability, the PDCCH resource utilization, and the PDCCH blocking probability. PDCCH configuration may be employed to reduce the payload size. The specific sizes of the DCI fields may be configured statically, semi-statically, or dynamically.

Disclosed herein are implementations to signal, e.g., dynamically, a change in the size of one or more of the DCI fields of the compact DCI without, for example the need for an RRC configuration change. A change may be gNB initiated, in which case the gNB may make the determination to change the field sizes. A gNB may determine to change field sizes based on any number of example factors including, for example: there is a loss in link level PDCCH reliability even at the lowest Aggregation Level (AL); there is poor PDCCH resource utilization; and/or there is an increase in the PDCCH blocking probability.

A change in the size of one or more DCI fields may be WTRU-initiated. In examples, one or more WTRUs may signal a request for a change in one or more fields. The determination to change the size of the DCI fields may be based, for example, on a determination, e.g., estimation, that the reliability of the PDCCH may be improved. In an example, a WTRU may make a high priority SR request and not receive a PDCCH grant. The WTRU may request that, for example, SR requests of a particular priority (or higher than a particular priority) or particular traffic type be scheduled with a modified compact DCI with different field sizes.

Figure 9:
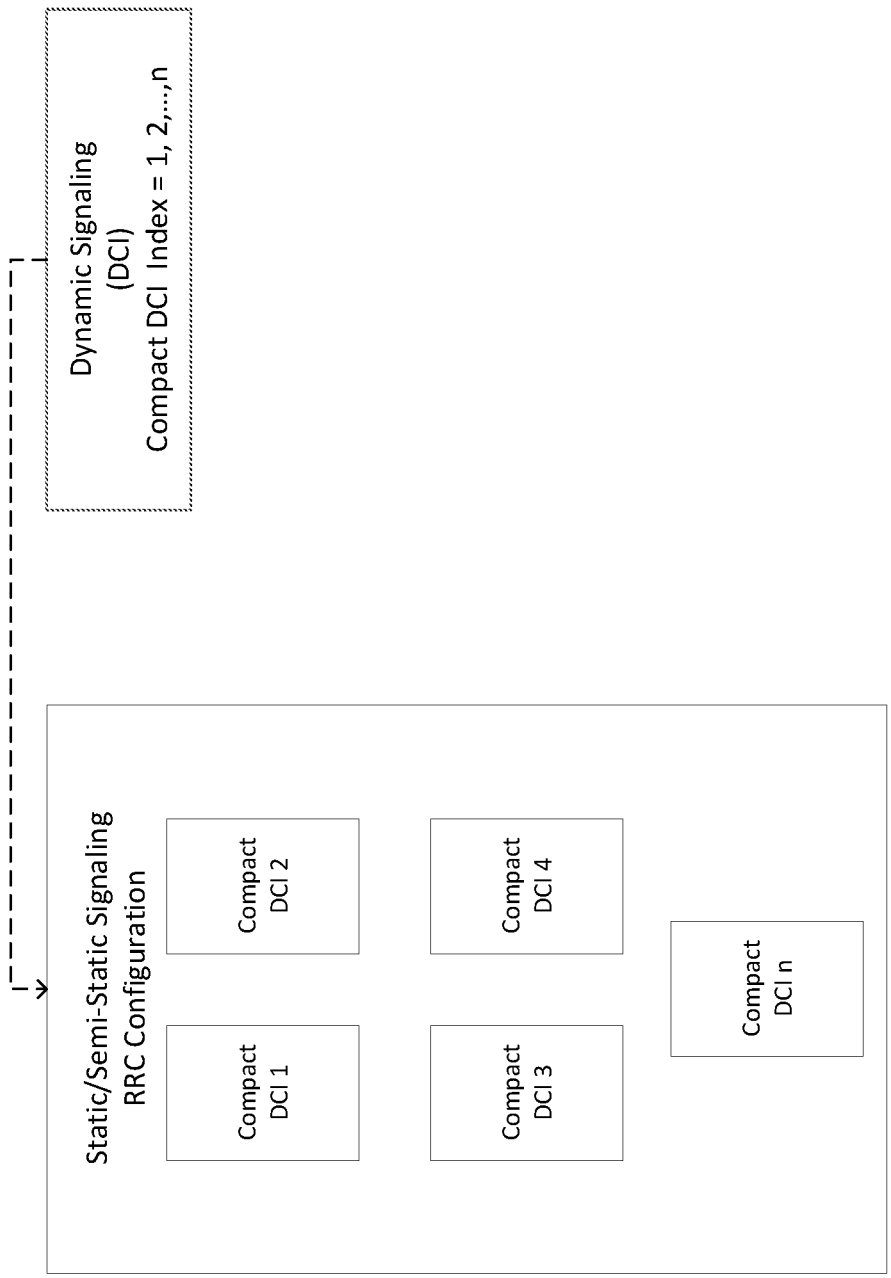
FIG. 9 is a diagram illustrating modifying a compact DCI using an index to a table containing DCI fields and associated sizes.

Signaling changes in DCI field size may be implemented in various manners. For example, dynamic configuration of the size of a DCI field in the compact DCI may be signaled by a dedicated DCI format. Dynamic configuration of the size of a DCI field in the compact DCI may be signaled as part of a generic DCI format, e.g., DCI format 2-1 for downlink PDCCH or DCI format for URLLC. Dynamic configuration of the size of a DCI field may be signaled in a WTRU-specific PDCCH to a specific WTRU. Dynamic configuration of the size of a DCI field may be signaled in a group common PDCCH to one or more WTRUs as a group. As shown in FIG. 9, a set of DCI-fields and their associated sizes may be set as an RRC configuration in a table and the PDCCH modifying the compact DCI size may index an entry to the table to indicate the change.

Figure 10:
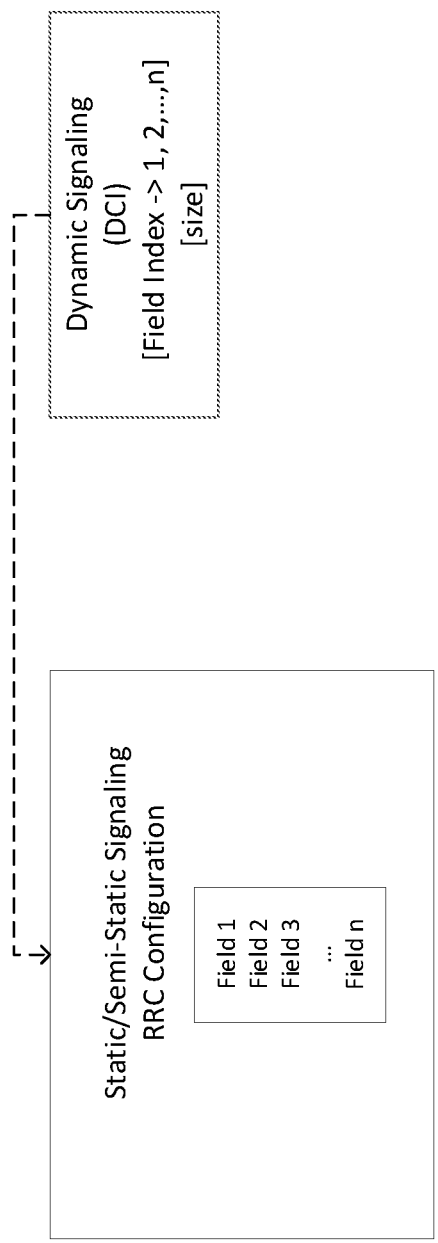
FIG. 10 is a diagram illustrating modifying a compact DCI using an index to a table containing DCI formats.

In an example, a set of pre-defined compact DCI formats may be set as an RRC configuration in a table and the PDCCH modifying the compact DCI size may index an entry to the table to indicate the change as shown in FIG. 10. In an example, to modify multiple fields simultaneously, the configuration for each field may be sent separately. To modify multiple fields simultaneously, a start field index and an end field index may be signaled, then the associated sizes for all the fields within the range may be signaled. To modify multiple fields simultaneously, a subset of the fields may be signaled and the properties of the other fields may be derived from the signaled fields by the URLLC WTRU.

Figure 11:
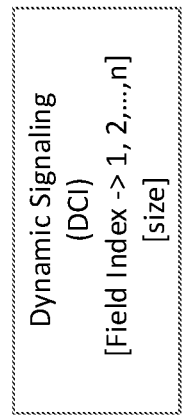
FIG. 11 is a diagram illustrating signaling DCI fields as an index with an associated size field.

In an example, and as illustrated in FIG. 11, the individual DCI fields may be predefined and signaled as an index with an associated size field, e.g. a field index of 00001 indicating the TDRA field and an associated field size of 5 bits may be signaled.

In scenarios where the WTRU signals a single DCI field size change, the WTRU may derive the field sizes of other fields and create a compact DCI based on pre-defined rules. In an example, the signaled sizes may be quantized, and the WTRU may derive the actual field size from the signaled quantized size. There may be a finite number of total sizes for the compact DCI. The WTRU may set the DCI field sizes and then zero pad the compact DCI to meet the next largest size. In an example, there may be a finite number of total sizes for the compact DCI. The WTRU may adjust the DCI field sizes based on specific rules and then zero pad the compact DCI to meet the next largest size.

Changes in field sizes may be UE specific. The changes in the field sizes may be based on a group of WTRUs.

A change in field sizes may be associated with a logical structure within the network or property of the network. In an example, a change in field size(s) may be associated with a PDCCH property or characteristic. The change may be to one or more of a CORESET, candidate CCE(s), aggregation level, or PDCCH search space, type of PDCCH search space, specific slot, specific DCI/PDCCH monitoring occasions and/or DCI format size(s). The change may involve an index to the DCI field, the size required, and/or the PDCCH property or characteristic with which it is associated. In an example, the change in field size(s) may be associated with a BWP. The change may involve an index to the DCI field, the size required, and/or the BWP with which it is associated. In an example, the change in field size(s) may be tied to a traffic type. The change may involve an index to the DCI field, the size required, and/or the traffic type it is associated with. In an example, the change in field size(s) may be tied to a WTRU priority or Logical Channel Priority. This may involve an index to the DCI field, the size required, and/or the priority it is associated with.

Dynamic signaling may be performed in connection with URLLC WTRUs. In an example, a URLLC WTRU may request configuration for a specific traffic type or priority. The request for configuration may be determined by the WTRU capability and/or by the traffic type the WTRU requests, e.g. an SR request. The request may be determined on initial access.

The requesting URLLC WTRU may receive a URLLC configuration from the WTRU. The URLLC configuration may include parameters for the compact DCI the WTRU may use. The URLLC configuration may include a configuration for monitoring a PDCCH that may direct a change in one or more fields of the compact DCI.

The WTRU may start monitoring a PDCCH, e.g. GC-PDCCH or WTRU-specific PDCCH, that indicates a change in the DCI-size of one or more of the compact DCIs associated with that WTRU. The WTRU may have a single WTRU specific compact DCI. The WTRU may have multiple DCIs associated with a logical structure within the network or property of the network. Examples may include, but are not be limited to, PDCCH properties/characteristics, traffic priorities, Logical Channel Priorities, CCEs, and BWPs.

If a WTRU detects a valid compact DCI field modifying signal, e.g., a GC-PDCCH or UE-specific PDCCH, the WTRU may change the size of its associated compact DCI field. The WTRU may directly use the signaled sizes. The WTRU may derive the field sizes of other fields and create a compact DCI based on pre-defined rules.

Accordingly, techniques are disclosed herein for detecting PDCCH. A WTRU may be configured to adaptively select for a slot in a downlink channel one of a plurality monitoring patterns that may be used to detect a PDCCH. Also disclosed are techniques for redundant data transport using multiple PDSCHs. A WTRU may receive a single DCI which specifies a schedule for multiple PDSCHs carrying the same data.

Multiple PDSCHs carrying redundant data sets may also be scheduled using multiple DCIs.

It will be appreciated that while illustrative embodiments have been disclosed, the scope of potential embodiments is not limited to those explicitly set out. For example, while systems have been described with reference to a particular numbers of slots, monitoring patterns, and CCEs, the envisioned embodiments extend beyond implementations using a particular numbers of slots, patterns, CCEs, etc. Although the features and elements may be described herein in particular combinations, each feature or element may be used alone, without the other features and elements, and/or in various combinations with or without other features and elements.

It is understood that the entities performing the processes described herein may be logical entities that may be implemented in the form of software (i.e., computer-executable instructions) stored in a memory of, and executing on a processor of, a mobile device, network node or computer system. That is, the method(s) may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in FIGS. may be performed by communication circuitry of the node under control of the processor of the node and the computer-executable instructions (e.g., software) that it executes.

The various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as flash drives, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit and receive unit (WTRU) comprising:
 a processor configured to:
 receive configuration information indicating associated search spaces, the associated search spaces comprising a first search space and a second search space and the configuration information indicating the first search space is associated with the second search space;
 receive downlink control information (DCI) in a first set of physical downlink control channel (PDCCH) candidates in the first search space and receive the DCI in a second set of PDCCH candidates in the second search space; and
 receive one or more physical downlink shared channels (PDSCHs) using the DCI.

2. The WTRU of claim 1,
 wherein the processor configured to receive the configuration information indicating the associated search spaces is configured to receive the configuration information via radio resource control (RRC) signaling.

3. The WTRU of claim 1,
 wherein the processor configured to receive the DCI in the first set of PDCCH candidates in the first search space and receive the DCI in the second set of PDCCH candidates in the second search space is configured to receive a same DCI in each of the first search space and the second search space.

4. The WTRU of claim 3,
wherein the processor configured to receive the same DCI in the first search space and the second search space is configured to receive the same DCI in each of the first set of PDCCH candidates in the first search space and the second set of PDCCH candidates in the second search space.

5. The WTRU of claim 4,
wherein the first set of PDCCH candidates and the second set of PDCCH candidates comprise a same set of PDCCH candidates.

6. The WTRU of claim 5,
wherein the processor configured to receive, in the associated search spaces, the DCI is configured to perform blind detection over the associated search spaces.

7. The WTRU of claim 1,
wherein the processor configured to receive the configuration information is configured to monitor the first search space and the second search space for the configuration information.

8. A method of physical downlink control channel (PDCCH) detection comprising:
receiving configuration information indicating associated search spaces, the associated search spaces comprising a first search space and a second search space and the configuration information indicating the first search space is associated with the second search space;
receiving downlink control information (DCI) in a first set of PDCCH candidates in the first search space and receiving the DCI in a second set of PDCCH candidates in the second search space; and
receiving one or more physical downlink shared channels (PDSCHs) using the DCI.

9. The method of claim 8, further comprising:
wherein receiving the DCI in the first set of PDCCH candidates in the first search space and receiving the DCI in the second set of PDCCH candidates in the second search space comprises performing blind detection over the associated search spaces.

10. The method of claim 8, further comprising:
receiving configuration information indicating second associated search spaces;
receiving, in the second associated search spaces, second DCI;
receiving a second one or more (PDSCH) using the second DCI;
wherein receiving one or more PDSCHs using the DCI comprises receiving a first PDSCH configured to carry first data; and
wherein receiving the second one or more PDSCHs using the second DCI comprises receiving a second PDSCH configured to carry the first data.

11. The method of claim 10,
wherein receiving, in the second associated search spaces, the second DCI comprises receiving the second DCI in each of a third set of PDCCH candidates in a third search space and a fourth set PDCCH candidates in a fourth search space.

12. The method of claim 8, wherein receiving the configuration information indicating the associated search spaces comprises receiving the configuration information via radio resource control (RRC) signaling.

13. The method of claim 8,
wherein receiving the DCI in the first set of PDCCH candidates in the first search space and receiving the DCI in the second set of PDCCH candidates in the second search space comprises receiving a same DCI in each of the first search space and the second search space.

14. The method of claim 13,
wherein receiving the same DCI in each of the first search space and the second search space comprises receiving the same DCI in each of the first set of PDCCH candidates in the first search space and the second set of PDCCH candidates in the second search space.

* * * * *